US012573173B2

(12) United States Patent
Nakayama

(10) Patent No.: US 12,573,173 B2
(45) Date of Patent: Mar. 10, 2026

(54) INFORMATION PROCESSING APPARATUS, INFORMATION PROCESSING METHOD, PROGRAM, IMAGING APPARATUS, AND IMAGING SYSTEM

(71) Applicant: Sony Semiconductor Solutions Corporation, Kanagawa (JP)

(72) Inventor: Satoshi Nakayama, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 360 days.

(21) Appl. No.: 17/784,595

(22) PCT Filed: Dec. 11, 2020

(86) PCT No.: PCT/JP2020/046242
§ 371 (c)(1),
(2) Date: Jun. 10, 2022

(87) PCT Pub. No.: WO2021/125076
PCT Pub. Date: Jun. 24, 2021

(65) Prior Publication Data
US 2023/0013424 A1     Jan. 19, 2023

(30) Foreign Application Priority Data

Dec. 18, 2019     (JP) ................................. 2019-228454

(51) Int. Cl.
G06K 9/00          (2022.01)
G06T 5/50          (2006.01)
(Continued)

(52) U.S. Cl.
CPC ................ G06V 10/60 (2022.01); G06T 5/50 (2013.01); G06T 5/77 (2024.01); G06T 7/70 (2017.01);
(Continued)

(58) Field of Classification Search
CPC .. G06T 5/50; G06T 2207/20221; G06V 10/60
See application file for complete search history.

(56) References Cited

U.S. PATENT DOCUMENTS 11,238,281 B1 *   2/2022   Cui ..................... G08G 5/0069
2011/0074957 A1    3/2011   Kiyohara et al.
(Continued)

FOREIGN PATENT DOCUMENTS

CN          110023952 A       7/2019
JP          2005-092262 A     4/2005
(Continued)

OTHER PUBLICATIONS

PCT/JP2020/046242, Mar. 2, 2021, International Search Report.
(Continued)

*Primary Examiner* — Molly Wilburn
*Assistant Examiner* — Aidan Keup
(74) *Attorney, Agent, or Firm* — Wolf, Greenfield & Sacks, P.C.

(57)          ABSTRACT

This information processing apparatus includes an image processing unit that detects a position of a light source in image data captured by an imaging apparatus and estimates an unnecessary light generation position in the image data on the basis of the detected position of the light source. The image processing unit detects, with respect to a plurality of pieces of image data respectively captured by a plurality of imaging apparatuses having partially common fields of view, positions of light sources and estimates unnecessary light generation positions on the basis of the detected positions of the light sources and combines pieces of image data of common field-of-view portions respectively captured by the plurality of imaging apparatuses and generates image data of the unnecessary light generation position with unnecessary light removed or reduced.

7 Claims, 20 Drawing Sheets

(51) Int. Cl.

| | | |
|---|---|---|
| *G06T 5/77* | (2024.01) |
| *G06T 7/70* | (2017.01) |
| *G06V 10/60* | (2022.01) |
| *G06V 10/74* | (2022.01) |

(52) U.S. Cl.
CPC .. *G06V 10/761* (2022.01); *G06T 2207/20221* (2013.01); *G06V 2201/07* (2022.01)

(56) References Cited

U.S. PATENT DOCUMENTS

| | | |
|---|---|---|
| 2012/0321203 A1 | 12/2012 | Yamashita |
| 2013/0120614 A1 | 5/2013 | Oyama |
| 2017/0208311 A1 | 7/2017 | Wachi |
| 2018/0300898 A1* | 10/2018 | Eshima ................ H04N 17/002 |
| 2019/0356873 A1 | 11/2019 | Douady-Pleven |

FOREIGN PATENT DOCUMENTS

| | | | |
|---|---|---|---|
| JP | 2011-077772 A | | 4/2011 |
| JP | 2013074493 A | * | 4/2013 |
| JP | 2013-179564 A | | 9/2013 |
| JP | 2015-005891 A | | 1/2015 |
| JP | 2017-126883 A | | 7/2017 |
| JP | 2019-212132 A | | 12/2019 |
| JP | 2019212321 A | | 12/2019 |
| WO | 2011/108207 A1 | | 9/2011 |

OTHER PUBLICATIONS

International Written Opinion and English translation thereof mailed Mar. 2, 2021 in connection with International Application No. PCT/JP2020/046242.

International Preliminary Report on Patentability and English translation thereof mailed Jun. 30, 2022 in connection with International Application No. PCT/JP2020/046242.

Extended European Search Report issued May 4, 2023 in connection with European Application No. 20902251.6.

International Search Report and English translation thereof mailed Mar. 2, 2021 in connection with International Application No. PCT/JP2020/046242.

* cited by examiner

41

51

4

42

5

52

Lens unit

Lens unit

Imaging
element unit

Imaging
element unit

Imaging apparatus

Imaging apparatus

Image data

1

7

6

Image processing unit

Memory
unit

Light source position
detection unit

61

Unnecessary light generation
position detection unit

62

Image combining unit

63

36
35

Input image

Binarized image

Partially enlarged image

| Flare position | | Flare size | Distance threshold from light source position |
|---|---|---|---|
| X | Y | D | $L_{TH}$ |
| $X_{F1}$ | $Y_{F1}$ | $D_{F1}$ | $L_{TH\_F1}$ |

INFORMATION PROCESSING APPARATUS, INFORMATION PROCESSING METHOD, PROGRAM, IMAGING APPARATUS, AND IMAGING SYSTEM

CROSS-REFERENCE TO RELATED APPLICATIONS

This application claims the benefit under 35 U.S.C. § 371 as a U.S. National Stage Entry of International Application No. PCT/JP2020/046242, filed in the Japanese Patent Office as a Receiving Office on Dec. 11, 2020, which claims priority to Japanese Patent Application Number 2019-228454, filed in the Japanese Patent Office on Dec. 18, 2019, each of which is hereby incorporated by reference in its entirety.

TECHNICAL FIELD

The present technology relates to an information processing apparatus, an information processing method, a program, an imaging apparatus, and an imaging system.

BACKGROUND ART

An imaging apparatus sometimes takes an image in which an image of unnecessary light such as ghost and flare is generated due to bright light such as sunlight reflected in the lens or barrel. Such an image of unnecessary light generated in the taken image lowers the image quality. In particular, it results in lowering the accuracy of image processing such as detecting a specific subject from image data.

Technologies for reducing image quality deterioration due to reflection of unnecessary light include, for example, technologies in which a pixel group that constitutes an angle of view is divided, a parallax image is thus captured by a single imaging element, and unnecessary light is reduced or removed by using this parallax image (e.g., see Patent Literatures 1 and 2).

CITATION LIST

Patent Literature

Patent Literature 1: Japanese Patent Application Laid-open No. 2017-126883
Patent Literature 2: Japanese Patent Application Laid-open No. 2013-179564

DISCLOSURE OF INVENTION

Technical Problem

However, also in the above-mentioned well-known technologies, there is a limitation on removing unnecessary light. In addition, a removal method that can sufficiently meet the accuracy of image processing such as detecting a specific subject from image data is unknown yet.

In view of the above-mentioned circumstances, it is an objective of the present technology to provide an imaging system, an imaging method, an information processing apparatus, and a program by which unnecessary light can be significantly removed or reduced from captured image data.

Solution to Problem

In order to solve the above-mentioned problem, an information processing apparatus according to the present technology includes an image processing unit that detects a position of a light source in image data captured by an imaging apparatus and estimates an unnecessary light generation position in the image data on the basis of the detected position of the light source.

The image processing unit may be configured to detect, with respect to a plurality of pieces of image data respectively captured by a plurality of imaging apparatuses having partially common fields of view, positions of light sources and estimate unnecessary light generation positions on the basis of the detected positions of the light sources and combine pieces of image data of common field-of-view portions respectively captured by the plurality of imaging apparatuses and generate image data of the unnecessary light generation position with unnecessary light removed or reduced.

The image processing unit may be configured to compare unnecessary light generation positions respectively estimated with respect to common field-of-view portions of the plurality of pieces of image data and adjust a blend ratio for the combination on the basis of a result of the comparison.

The information processing apparatus may further include a memory unit that stores, in advance, information regarding the unnecessary light generation position with respect to the position of the light source in the image data, in which the image processing unit may be configured to estimate the unnecessary light generation position on the basis of the detected position of the light source and the information stored by the memory unit.

The image processing unit may be configured to determine, on the basis of a distance between the detected position of the light source and an unnecessary light generation prediction position that is fixedly predetermined, whether the estimated unnecessary light generation position is a significant unnecessary light generation position.

The image processing unit may be configured to recognize a specific target from the image data captured by the imaging apparatus and generates a recognition result together with a degree of reliability of the recognition result and update the degree of reliability in accordance with presence/absence of the estimated unnecessary light generation position or a degree of overlapping between a position of the recognized target and the unnecessary light generation position.

Moreover, an information processing method that is another aspect of the present technology includes: detecting a position of a light source in image data captured by an imaging apparatus; and estimating unnecessary light generation position in the image data on the basis of the detected position of the light source.

A program that is another aspect of the present technology is a program that causes a computer to execute: detecting a position of a light source in image data captured by an imaging apparatus; and estimating unnecessary light generation position in the image data on the basis of the detected position of the light source.

An imaging apparatus that is still another aspect of the present technology includes: an imaging element unit that captures image data; and an image processing unit that detects a position of a light source in the image data captured by the imaging element unit and estimates an unnecessary light generation position in the image data on the basis of the detected position of the light source.

In addition, an imaging system that is another aspect of the present technology includes: a plurality of imaging apparatuses having partially common fields of view; and an image processing unit that detects, with respect to a plurality of pieces of image data respectively captured by the plurality of imaging apparatuses, positions of light sources and estimates unnecessary light generation positions on the basis of the detected positions of the light sources and combines pieces of image data of common field-of-view portions respectively captured by the plurality of imaging apparatuses and generates image data of the unnecessary light generation position with unnecessary light removed or reduced.

An imaging system that is still another aspect of the present technology includes: a plurality of imaging apparatuses having partially common fields of view; and an image processing unit that recognizes a specific target from pieces of image data respectively captured by the plurality of imaging apparatuses and generates a recognition result together with a degree of reliability of the recognition result and updates the degree of reliability in accordance with presence/absence of the estimated unnecessary light generation position or a degree of overlapping between a position of the recognized target and the unnecessary light generation position.

MODE(S) FOR CARRYING OUT THE INVENTION

Hereinafter, an embodiment of the present technology will be described with reference to the drawings.

First Embodiment

Figure 1:
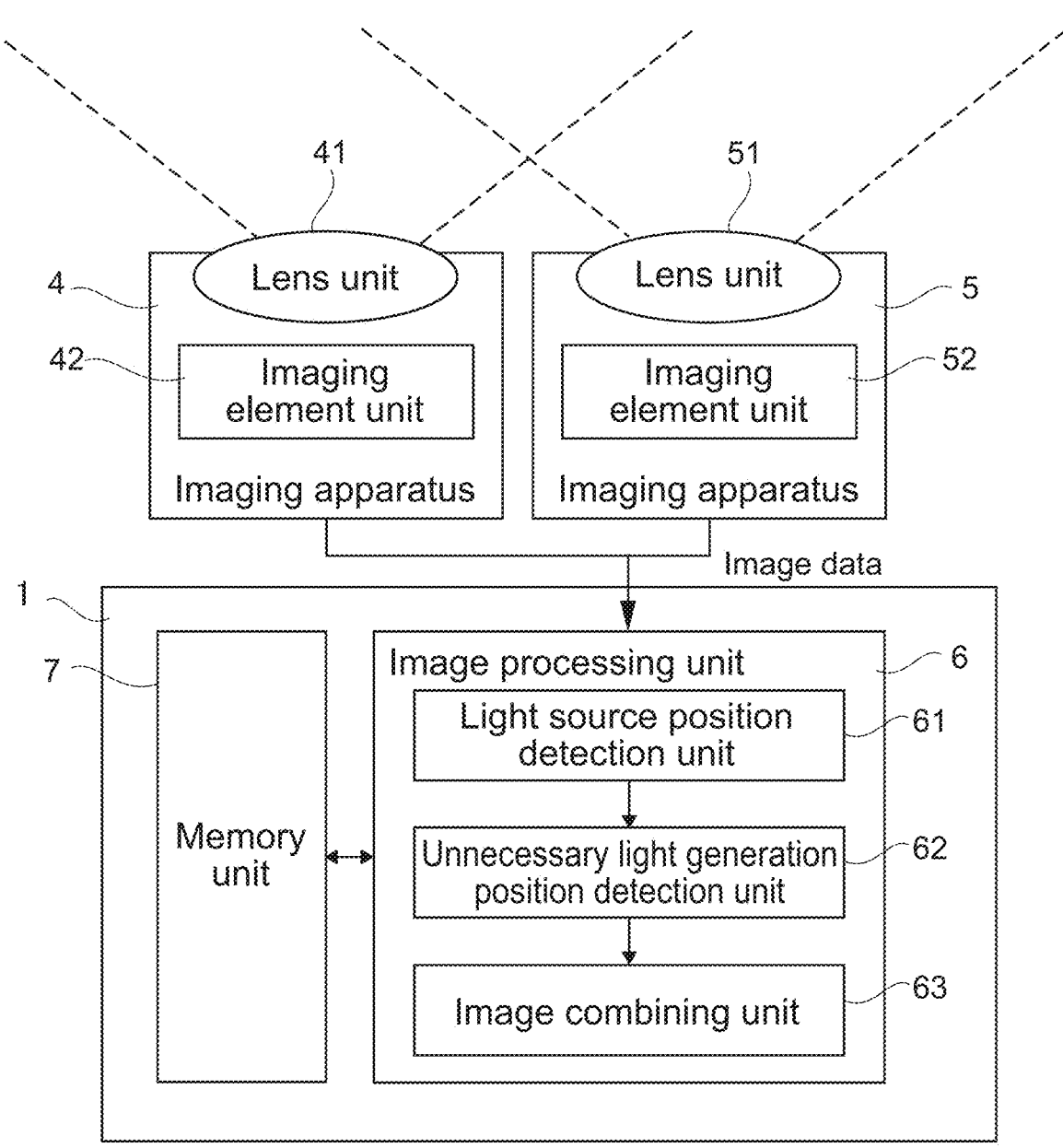
FIG. 1 A block diagram showing a configuration of an information processing apparatus according to this embodiment.

FIG. 1 is a block diagram showing a configuration of an information processing apparatus 1 according to a first embodiment of the present technology.

The information processing apparatus 1 according to this embodiment includes an image processing unit 6 that detects positions of light sources in pieces of image data captured by imaging apparatuses 4 and 5 and calculates unnecessary light generation positions in the pieces of image data on the basis of the detected positions of the light sources.

The information processing apparatus 1 and the imaging apparatuses 4 and 5 constitute a single imaging system.

The imaging apparatuses 4 and 5 have imaging fields of view partially common to each other and respectively include imaging element units 42 and 52 including lens units 41 and 51, charge-coupled devices (CCD) that photoelectrically convert imaging light entering them through the lens units 41 and 51, imaging elements such as complementary metal oxide semiconductors (CMOS), signal processing circuits that generate pieces of image data from electrical signals generated at the imaging elements, and the like.

A memory unit 7 is used for image processing of the image processing unit 6 and is capable of storing a database and the like.

The image processing unit 6 processes pieces of image data, which have been obtained by the plurality of imaging apparatuses 4 and 5 having the imaging fields of view partially common to each other, by the use of the memory unit 7. The image processing unit 6 has a light source position detection unit 61, an unnecessary light generation position detection unit 62, and an image combining unit 63.

The light source position detection unit 61 detects, from image data, an image corresponding to a light source such as the sun and a car head lamp and performs processing of detecting position and size or the like of the light source image.

On the basis of information regarding the position and size or the like of the light source image detected by the light source position detection unit 61 and information for unnecessary light generation position estimation, which has been stored in the database of the memory unit 7 or the like in advance, the unnecessary light generation position detection unit 62 detects a position of an image of unnecessary light generated in the image data due to diffuse reflection of light of the light source in the lens units 41 and 51 or barrels of the imaging apparatuses 4 and 5 (hereinafter, referred to as "unnecessary light generation position").

The image combining unit 63 combines pieces of image data of the common field-of-view portions of the plurality of pieces of image data obtained by the plurality of imaging apparatuses 4 and 5, to thereby generate a virtual single-viewpoint image with unnecessary light removed or reduced.

The virtual single-viewpoint image generated by the image processing unit 6 is output to a display unit of an external monitor or the like through a transmission channel via an external interface.

In recent years, information is acquired from a plurality of pieces of image data obtained by a plurality of imaging apparatuses mounted on a vehicle for the purpose of monitoring the periphery of the vehicle for realizing self-driving. At this time, in a case where bright light enters the imaging apparatus from a light source such as sunlight and a head lamp of another vehicle, there is a fear that unnecessary light such as ghost and flare is reflected on the image and it lowers the accuracy of detecting targets such as white lines on the road and pedestrians for self-driving.

Moreover, the position at which unnecessary light is reflected on the image varies depending on the position of the light source that can be seen from the imaging apparatus. Therefore, it has been difficult to remove unnecessary light by image processing assuming that unnecessary light is generated at fixed positions, such as generally-used lens dirt detection and defective-pixel correction, for example. In addition, although it is possible to reduce lowering of the visibility due to unnecessary light by contrast adjustment or the like, the visibility of a subject in the periphery of the unnecessary light lowers in this case.

Figure 2:
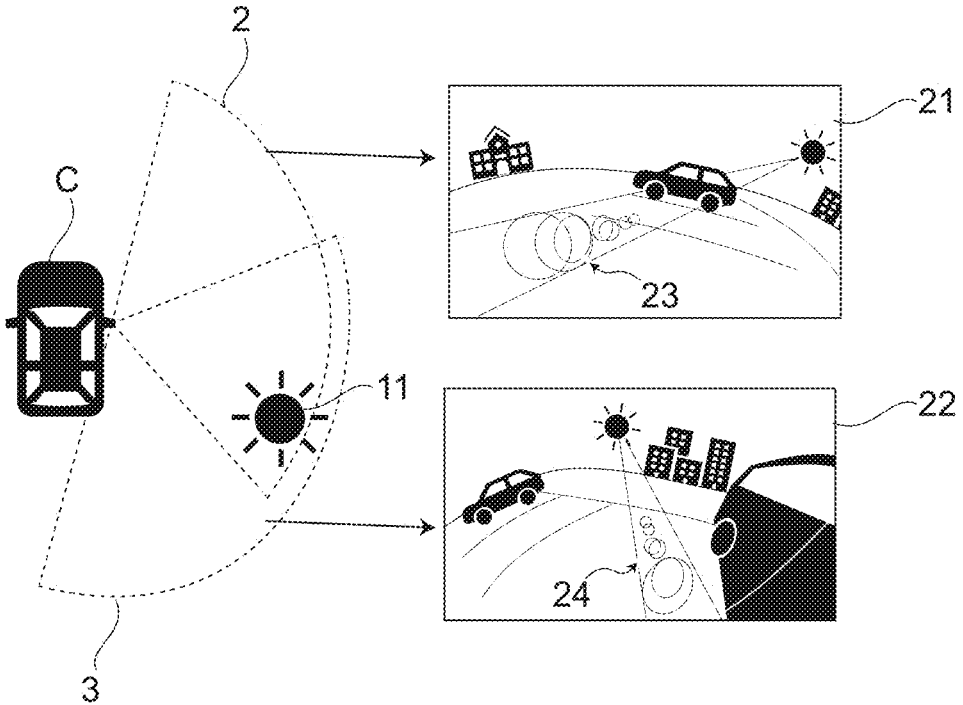
FIG. 2 A diagram showing an example of respective imaging fields of view 2 and 3 of a plurality of imaging apparatuses and pieces of image data 21 and 22 respectively corresponding to the imaging fields of view 2 and 3.

FIG. 2 is a diagram showing an example of respective imaging fields of view 2 and 3 of the plurality of imaging apparatuses and pieces of image data 21 and 22 respectively corresponding to the imaging fields of view 2 and 3. In the respective pieces of image data 21 and 22, light sources 11 are present at different positions. Ghosts 23 and 24, which are unnecessary light, are generated at positions corresponding to the positions of the light sources 11 in the respective pieces of image data 21 and 22.

A case of combining such two pieces of image data 21 and 22 into a virtual single-viewpoint image will be considered.

Figure 3:
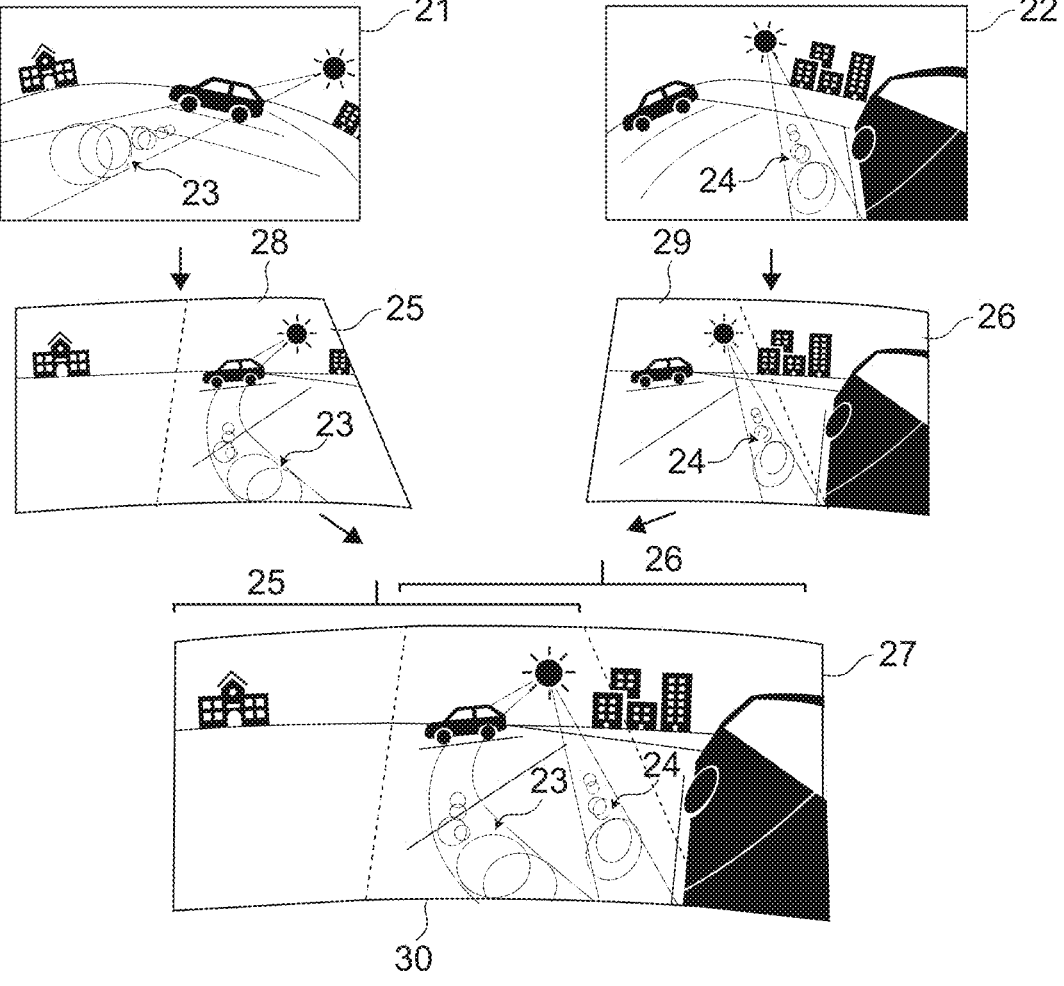
FIG. 3 A diagram for describing a typical combination method for the pieces of image data 21 and 22.

As shown in FIG. 3, in a typical combination method, with respect to the two respective pieces of image data 21 and 22 generated by the two imaging apparatuses, first of all, projection images 25 and 26 for achieving a single viewpoint are generated, and the respective projection images 25 and 26 are combined, and a single-viewpoint image 27 is generated. At the time of combination, the common field-of-view portions 28 and 29 in the two projection images 25 and 26 are combined at a predetermined blend ratio. The reference sign 30 indicates a result of the combination of the common field-of-view portions 28 and 29. However, with this typical combination method, unnecessary light such as the ghosts 23 and 24 present in the pieces of image data 21 and 22 remain after the combination.

Figure 4:
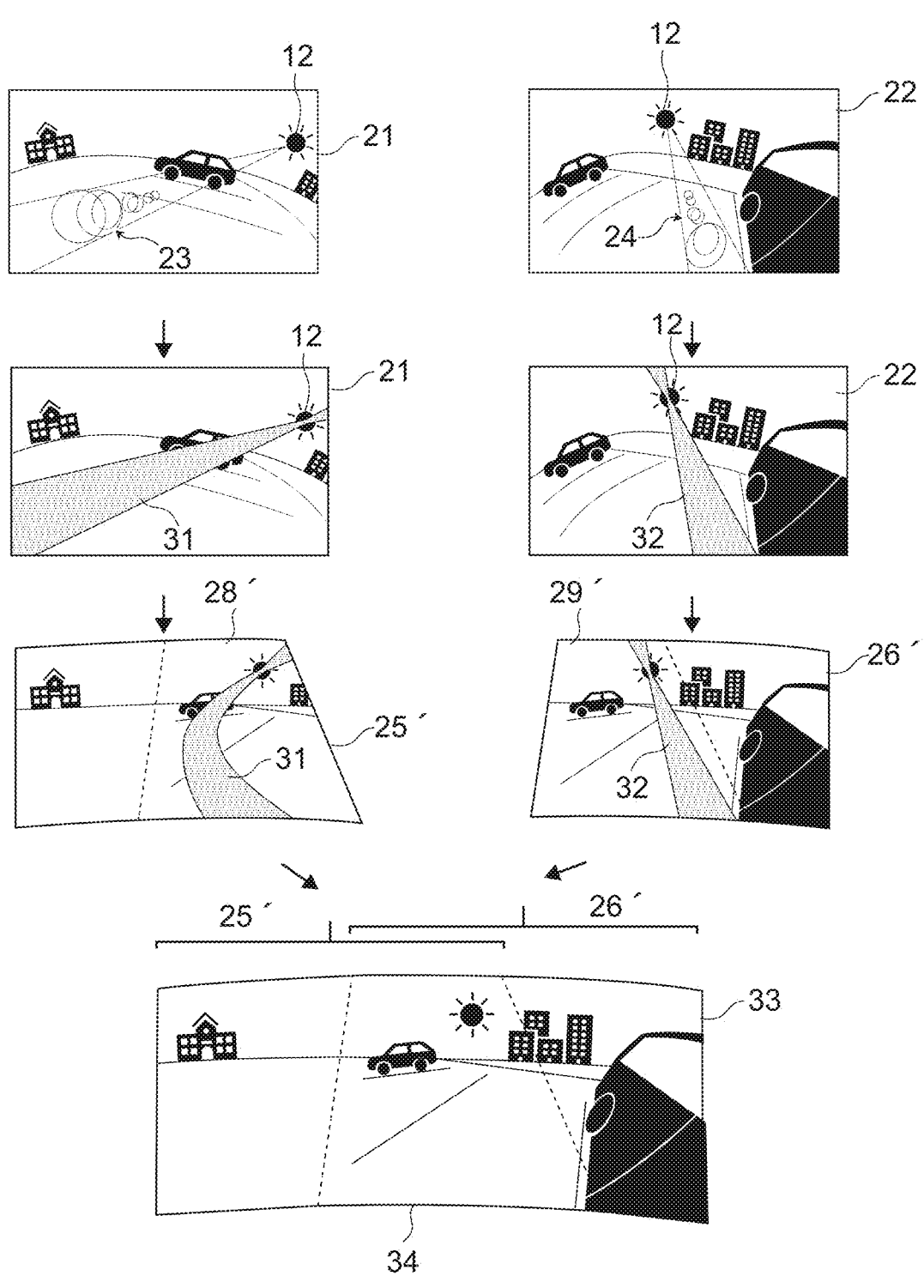
FIG. 4 A diagram for describing a combination method according to this embodiment.

In the combination method according to this embodiment, as shown in FIG. 4, the image processing unit 6 detects, with respect to the two respective pieces of image data 21 and 22 generated by the two imaging apparatuses 4 and 5, information regarding the position and size or the like of light source images 12 of the sun or the like, and estimates unnecessary light generation positions 31 and 32 in the pieces of image data 21 and 22 on the basis of this information regarding the position and size or the like of the light source images 12 and the information for unnecessary light generation position estimation stored in the database in advance. This estimation of the unnecessary light generation positions 31 and 32 can be performed on the basis of, for example, a positional relationship or the like between the positions of the light source images 12 and the optical axis centers of the imaging apparatuses 4 and 5. That is, in particular, ghosts generally appear on straight lines connecting the positions of the light source images 12 and the optical axis centers of the imaging apparatuses due to the lens structure, and at which positions on the straight lines the ghosts appear depends on the structures and types of the imaging apparatuses 4 and 5, and in addition, the orientations of the optical axes of the imaging apparatuses 4 and 5, the mounting positions, and the like in a case where the light source is a car head lamp. Moreover, depending on the structure and types of the imaging apparatuses 4 and 5, there is also a case where the ghosts appear at positions other than the positions on the straight lines connecting the positions of the light source images 12 and the optical axis centers of the imaging apparatuses 4 and 5. In view of this, for each of the above-mentioned conditions, information for unnecessary light generation position estimation indicating at which position a ghost appears with respect to the position of the light source image is stored in the database and the information is referred to at the time of combination.

In addition, a ghost generated due to dirt or damage on the lens surface or dust in the barrel is called "flare". In general, the generation position of a flare is fixed for each of the imaging apparatuses 4 and 5. In view of this, in a case of using the imaging apparatuses 4 and 5 in which flares can be generated, it is sufficient to store information regarding a flare generation position specific to each of the imaging apparatuses 4 and 5 in the database and refer to the information at the time of estimation of the unnecessary light generation position.

It should be noted that the database may be one provided in the memory unit 7 of the imaging system or may be a database in a network that the imaging system is capable of accessing.

After the image processing unit 6 estimates the unnecessary light generation positions 31 and 32, the image processing unit 6 generates projection images 25' and 26' for achieving a single viewpoint with respect to the two respective pieces of image data 21 and 22 generated by the two imaging apparatuses 4 and 5. The image processing unit 6 combines those projection images 25' and 26' to generate a virtual single-viewpoint image 33. At this time, with respect to common field-of-view portions 28' and 29' in the respective projection images 25' and 26', the blend ratio at the time of combination is adjusted on a pixel-by-pixel basis so that unnecessary light of the unnecessary light generation positions 31 and 32 becomes less prominent. The reference sign 34 indicates a result of the combination of the common field-of-view portions 28 and 29.

Calculation Method for Unnecessary Light
Generation Estimation Positions

FIGS. 5 to 8 are diagrams describing a method of determining unnecessary light generation estimation positions.

Figure 5:
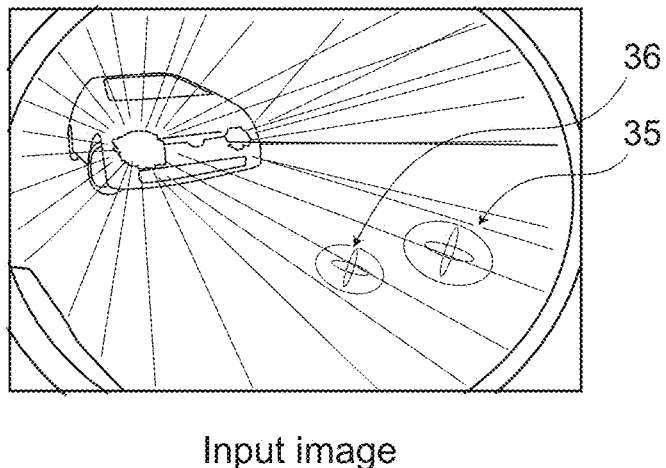
FIG. 5 A diagram showing an example of captured image data.

FIG. 5 is an example of image data obtained by the imaging apparatus. In this example, the light source is left and right head lamps of a car and ghosts 35 and 36 are reflected at point-symmetrical positions of the left and right head lamps.

Figure 6:
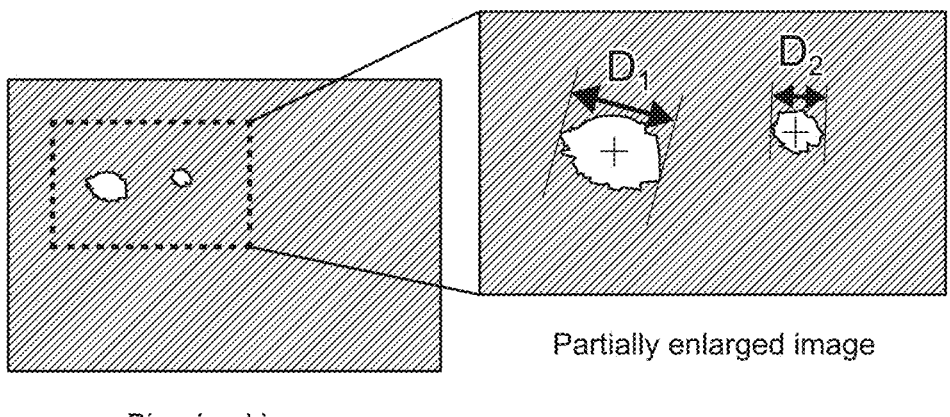
FIG. 6 A diagram for describing a method of detecting positions of light sources from the image data of FIG. 5.

First of all, the image processing unit 6 binarizes, as shown in FIG. 6, pieces of image data mapped in a grid coordinate space of N (vertical) by M (horizontal), for example, as a threshold and detects the center position and the diameter of each of light source images (images of light of the two head lamps) from the binarized pieces of image data. The diameter of the light source image may be, for example, the maximum diameter of the light source image or may be the average of vertical and horizontal diameters.

Figure 7:
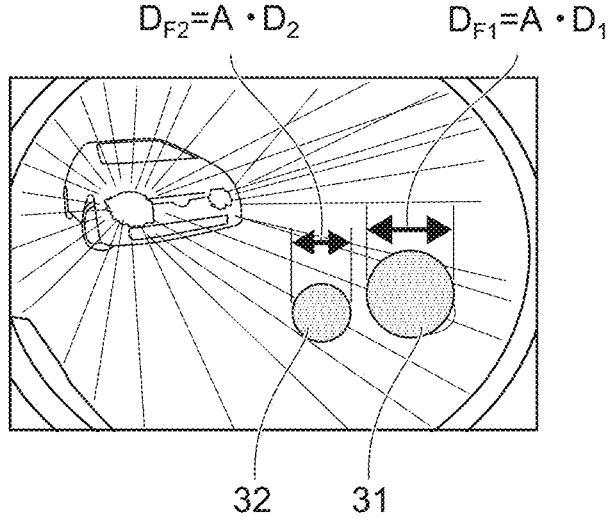
FIG. 7 A diagram showing a calculation method for unnecessary light generation positions.

Next, the image processing unit 6 estimates an unnecessary light generation position on the basis of the center position and the diameter of the light source and the information for unnecessary light generation position estimation stored in the database. The information for unnecessary light generation position estimation stored in the database is constituted by a correspondence table of the center position of the light source and the center position of the unnecessary light generation position, the size ratio (coefficient A) of the unnecessary light generation position to the diameter of the light source image, and the like. For example, as shown in FIG. 7, in a case where shapes of regions occupied by the unnecessary light generation positions 31 and 32 are circular, diameters $D_{F1}$ and $D_{F2}$ of the unnecessary light generation positions to the two respective light source images are calculated as follows.

$$D_{F1}=A \times D_1$$

$$D_{F2}=A \times D_2$$

Where $D_1$ and $D_2$ denote the respective diameters of the two light source images and A denotes the size ratio (coefficient A) of the unnecessary light generation position to the diameter of the light source image.

Figure 8:
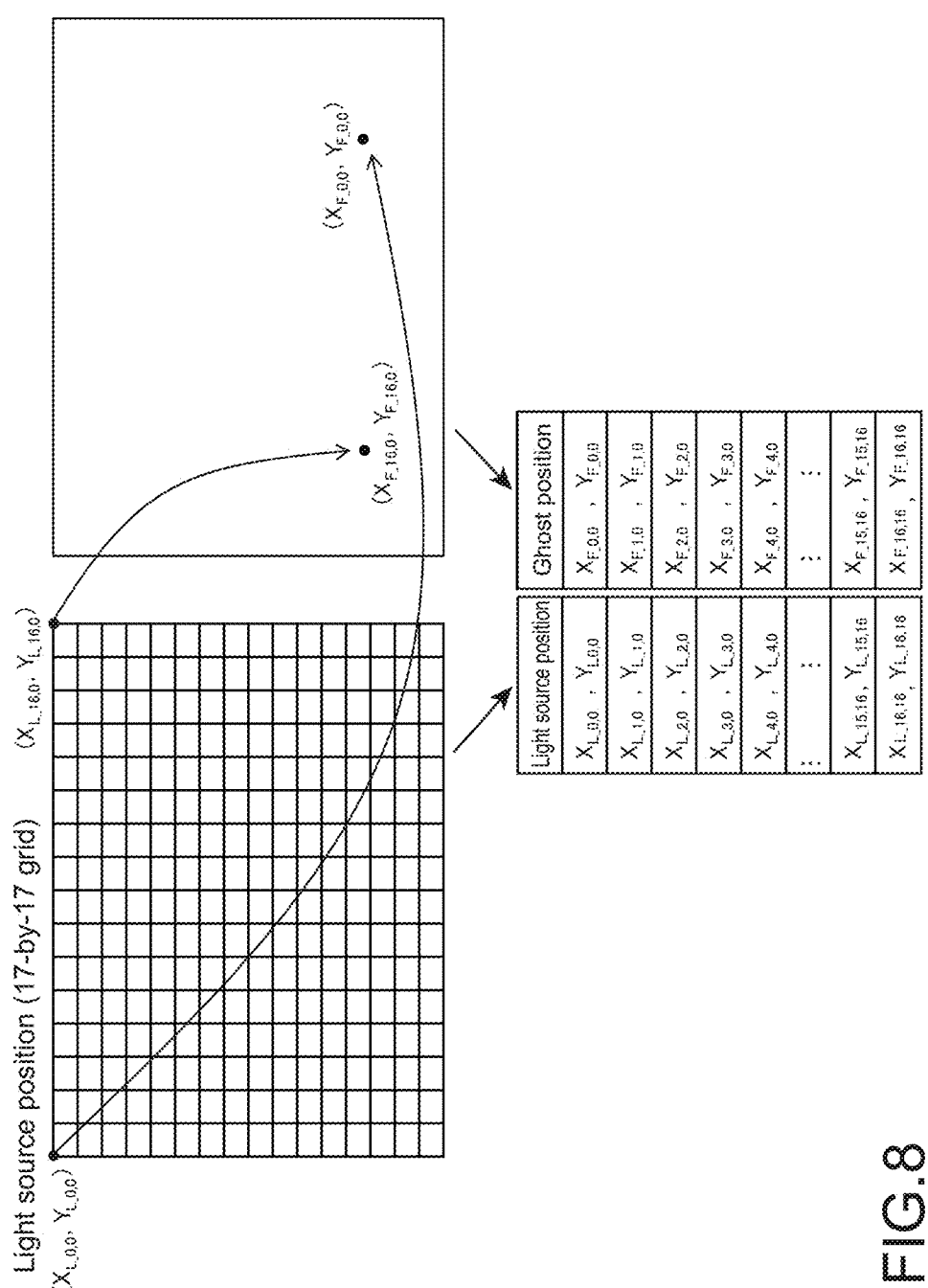
FIG. 8 A diagram showing a correspondence table of center positions of light source images and center positions of unnecessary light generation positions.

FIG. 8 is a diagram for describing a correspondence table of center positions of light source images and center positions of unnecessary light generation positions. As shown in the figure, this correspondence table shows, as vector data, a relationship between center positions (XL, YL) of the light sources and center positions $(X_F, Y_F)$ of the unnecessary light generation positions in a coordinate space represented by equally dividing a piece of image data in N×M.

Figure 9:
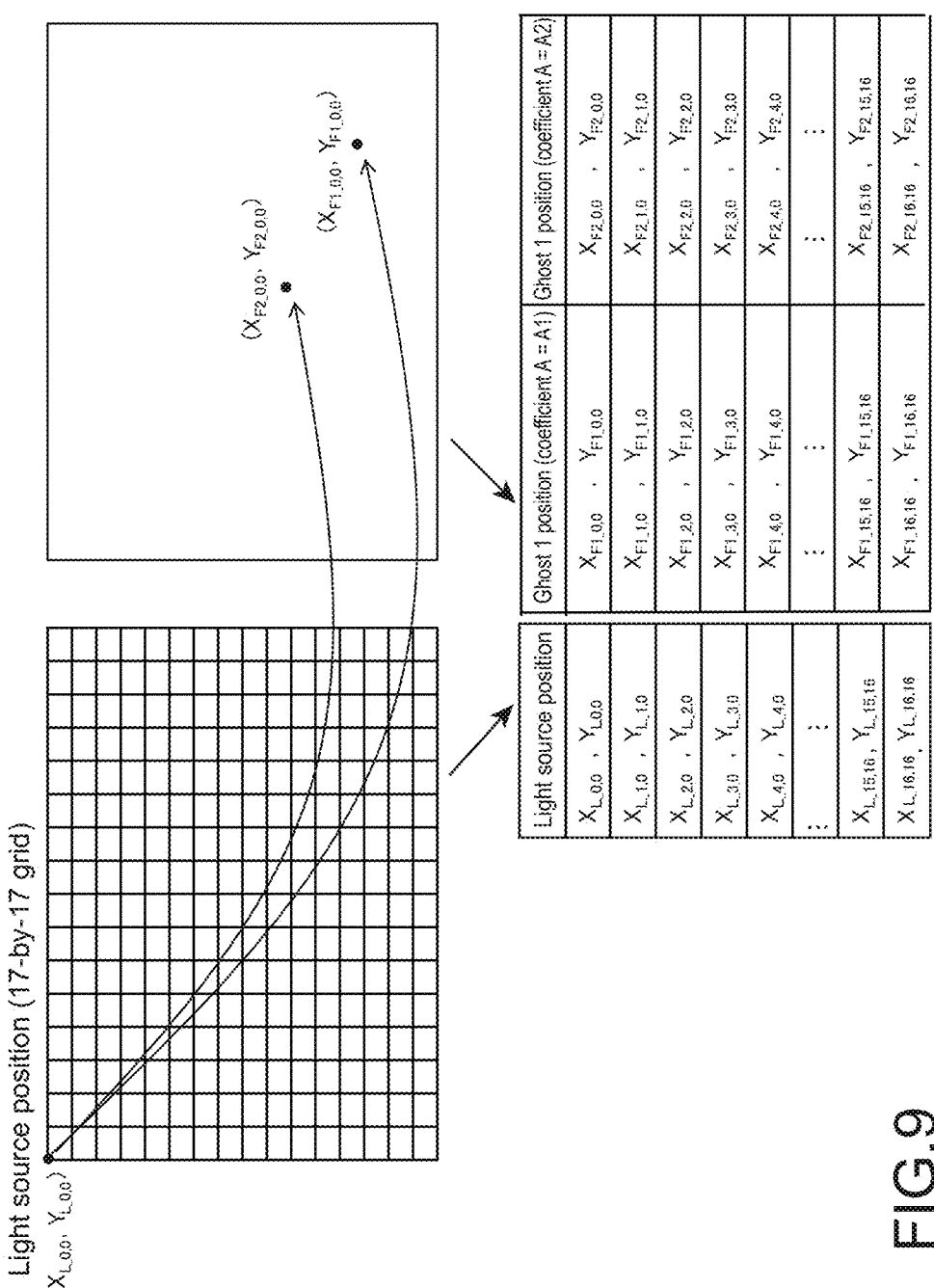
FIG. 9 A diagram showing another example of the correspondence table.

Depending on the structure of the imaging apparatus, there is a case where a plurality of ghosts are simultaneously generated with respect to each light source. In this case, as shown in FIG. 9, it is sufficient to prepare a table in which center positions of a plurality of unnecessary light generation positions are associated with the center position of each light source. In addition, in this case, the size of the plurality of unnecessary light generation positions with respect to the single light source can be varied by storing, in the database, the size ratio (coefficient A1, A2) of a plurality of unnecessary light generation positions to the diameter of the light source image at each unnecessary light generation position.

Figure 10:
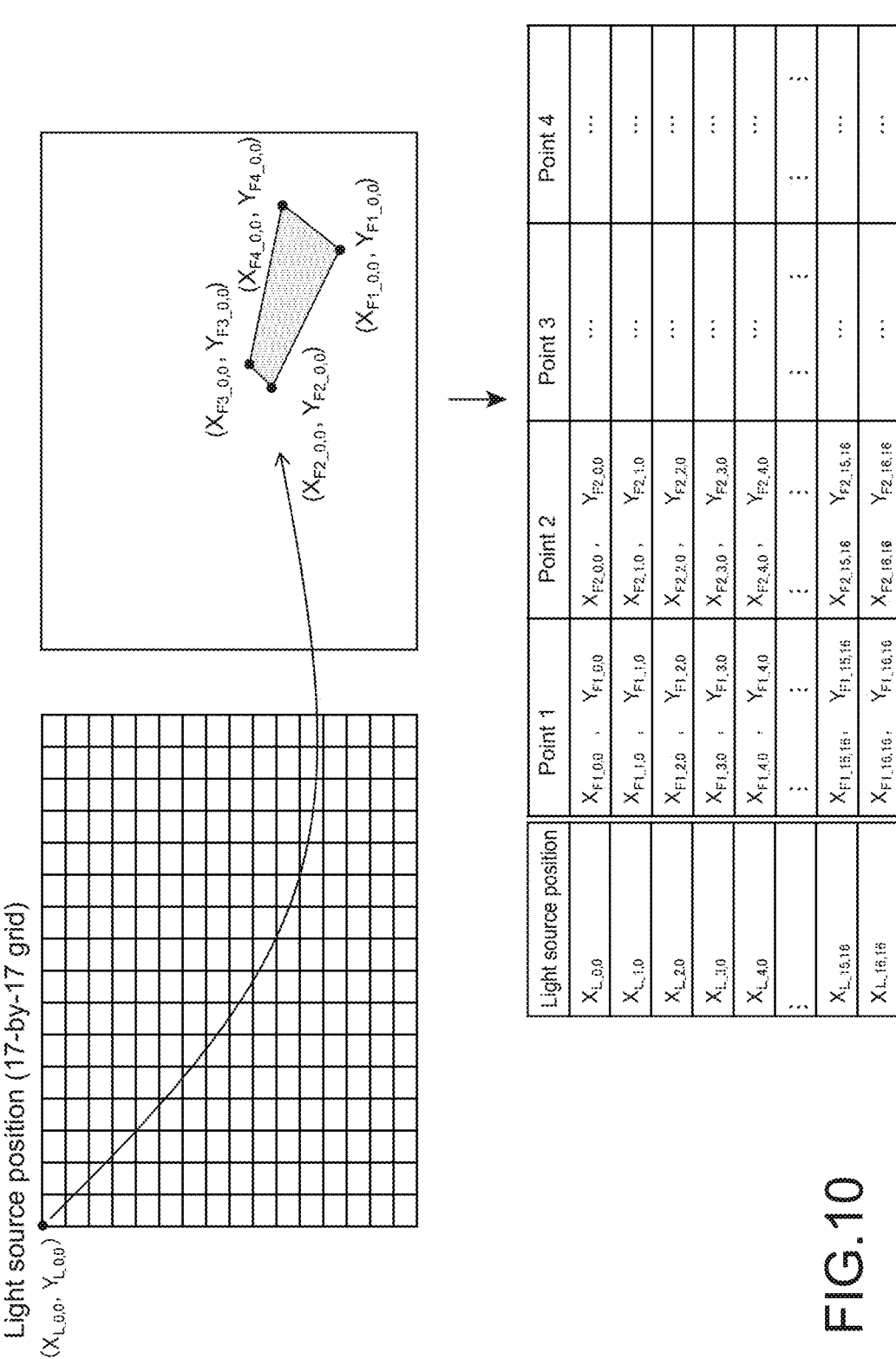
FIG. 10 A diagram showing still another example of the correspondence table.

In addition, as shown in FIG. 10, each unnecessary light generation position with respect to the center position of the light source may be specified as a region that can be formed by connecting a plurality of vertices such as four vertices, for example, the grid coordinate space of N (vertical) by M (horizontal).

In addition, information that specifies the unnecessary light generation position can be in various formats.

Method of Estimating Flare Generation Region as Unnecessary Light Generation Position The method of estimating a ghost generation region that can vary in accordance with the light source position as the unnecessary light generation position has been described herein. However, in a case where a flare is generated due to dirt or damage on the lens surface or dust in the barrel, unnecessary light is generated at a fixed position in the angle of view irrespective of the light source position. The luminance of unnecessary light generated due to a flare is higher and the unnecessary light is more prominent in the image as the light source is located closer to the imaging apparatus. In view of this, such a flare generation region, in particular, a region in which a high-luminance flare is reflected may be estimated as the unnecessary light generation position similar to the ghost generation region and combining into the virtual single-viewpoint image may be performed.

Figures 11, 12:
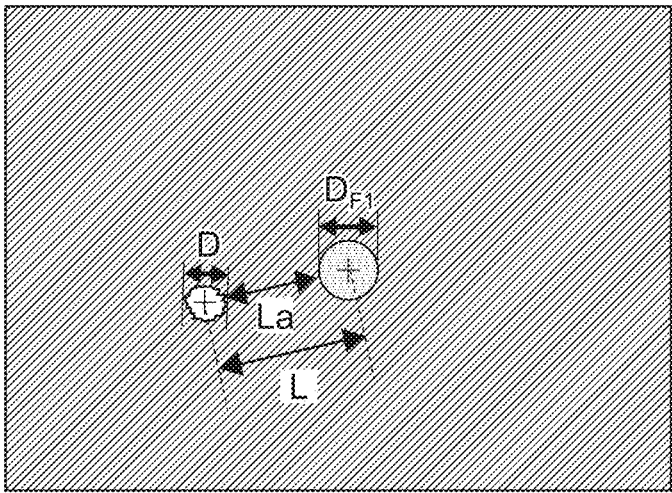
FIG. 11 A diagram describing a method of determining unnecessary light generation positions derived from flares.
FIG. 12 A diagram describing a database used when determining unnecessary light generation positions derived from flares also.

FIGS. 11 and 12 are diagrams describing a method of determining an unnecessary light generation position that derives from a flare.

In a case where an imaging apparatus in which there can be an unnecessary light generation position that derives from a flare is used, as shown in FIG. 12, a flare center position $(X_F, Y_F)$ and a flare size DF in image data and a light source-flare position distance threshold $L_{TH\_F1}$ corresponding thereto are stored in the database in advance.

First of all, the image processing unit 6 detects position (center position) and size (diameter) of the light source in the image data obtained by the imaging apparatus. Next, as shown in FIG. 11, the image processing unit 6 determines a light source-flare edge distance La on the basis of the detected position and size (diameter) of the light source (center position) and the flare center position $(X_F, Y_F)$ and the flare size DF 1 stored in the database. Here, the light source-flare edge distance La is calculated in accordance with the equation below.

$$La=L-(D/2)-(D_{F1}/2)$$

Where L denotes a distance between the position (center position) of the light source and the flare center position $(X_F, Y_F)$.

Next, the image processing unit 6 determines, in a case where La is equal to or smaller than the distance threshold $L_{TH\_F1}$, the flare generation region that derives from its light source as the unnecessary light generation position, and determines, in a case where La is larger than the distance threshold $D_{TH\_F1}$, that the flare generation position that derives from its light source is not the unnecessary light generation position.

That is, since the luminance of the flare is higher and the flare is more prominent as the light source is located closer to the imaging apparatus in the real space, unnecessary processing can be omitted by determining the flare generation position as the unnecessary light generation position only in such a case and ignoring flares having small influences on the image visibility at the time of combining into the virtual single-viewpoint image.

Figure 13:
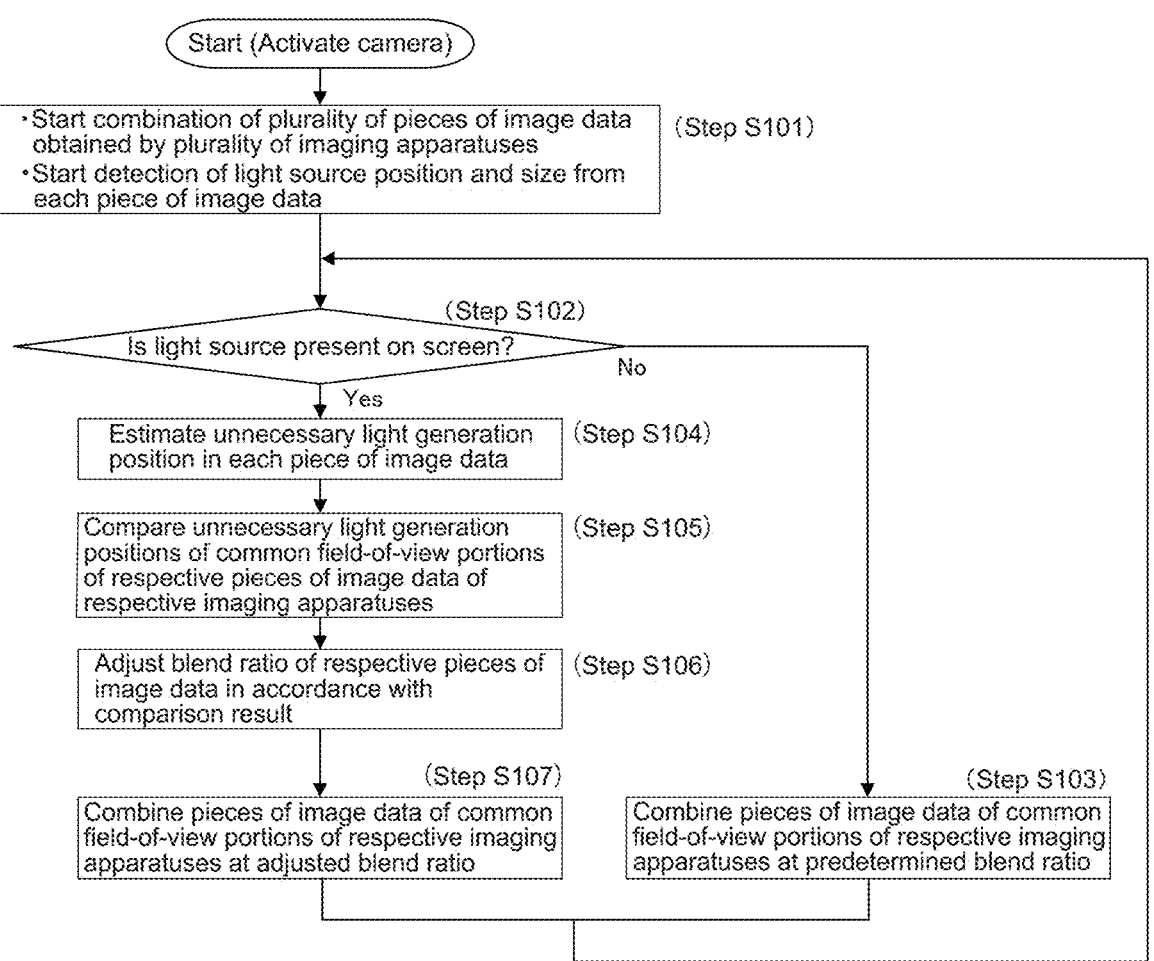
FIG. 13 A flowchart of an operation when combining a plurality of pieces of image data obtained by the plurality of imaging apparatuses into a virtual single-viewpoint image with unnecessary light removed or reduced.

Next, an operation when combining a plurality of pieces of image data obtained by a plurality of imaging apparatuses having imaging fields of view partially common to each other into a virtual single-viewpoint image with unnecessary light removed or reduced will be described using the flowchart of FIG. 13.

First of all, when the plurality of imaging apparatuses 4 and 5 is activated, the image processing unit 6 starts to combine the plurality of pieces of image data obtained by the plurality of imaging apparatuses 4 and 5 and also starts to detect position and size of a light source reflected on each of the pieces of image data (Step S101). In a case where a light source in each of the pieces of image data obtained by the respective imaging apparatuses 4 and 5 is not detected (No in Step S102), the image processing unit 6 combines (Step S103) the pieces of image data of the common field-of-view portions of the respective imaging apparatuses 4 and 5 at a predetermined normal steady blend ratio when the image processing unit 6 combines the plurality of pieces of image data into the virtual single-viewpoint image.

Moreover, in a case where a light source is detected in at least one of the pieces of image data of the common field-of-view portions of the respective imaging apparatuses 4 and 5 (Yes in Step S102), the image processing unit 6 detects, for each piece of image data, the position and size of the light source and estimates an unnecessary light generation position in each piece of image data on the basis of such detection information and the information for unnecessary light generation position estimation stored in the database (Step S104).

Next, with respect to each of the pieces of image data obtained by the plurality of imaging apparatuses, the image processing unit 6 generates a projection image for combining into the single-viewpoint image and compares the unnecessary light generation positions of the common field-of-view portions in the respective projection images on a pixel-by-pixel basis, for example (Step S105).

The image processing unit 6 adjusts the blend ratio of each piece of image data in accordance with a result of the comparison (Step S106). At this time, with respect to a pixel at which only one piece of image data belongs to the unnecessary light generation position, the blend ratio with respect to each piece of image data is adjusted so that the unnecessary light image of this unnecessary light generation position is reduced. For example, the value of the blend ratio with respect to the one piece of image data belonging to the unnecessary light generation position is lowered and the value of the blend ratio with respect to the other piece of image data not belonging to the unnecessary light generation position is increased. The value of the blend ratio may be set to 0% when lowering the value of the blend ratio, and the value of the blend ratio may be set to 100% when increasing the value of the blend ratio.

It should be noted that with respect to a pixel at which both the pieces of image data belong to the unnecessary light generation position, interpolation may be performed using a composite value determined with respect to adjacent pixels.

The image processing unit 6 combines the pieces of image data of the common field-of-view portions of the respective pieces of image data at the blend ratio adjusted with respect to each piece of image data in the above-mentioned manner (Step S107). Accordingly, a composite image with unnecessary light removed or reduced is obtained.

Moreover, in accordance with this embodiment, for example, the unnecessary light generation position, the position and size of which depend on the properties of the imaging apparatus, can be correctly estimated on the basis of the information for unnecessary light generation position estimation stored in the database of the memory unit 7 or the like, and therefore an imaging system excellent in availability and having a high unnecessary light-removing effect is obtained. Accordingly, for example, targets surrounding the vehicle can be accurately and stably detected.

Modified Example 1

In the above-mentioned embodiment, in a case where unnecessary light generation positions of the plurality of pieces of image data are present overlapping each other in the common field-of-view portions combined in the plurality of pieces of image data, the image of the portion in which the unnecessary light generation positions overlap each other is interpolated using values of adjacent pixels. The present technology is not limited thereto.

Figure 14:
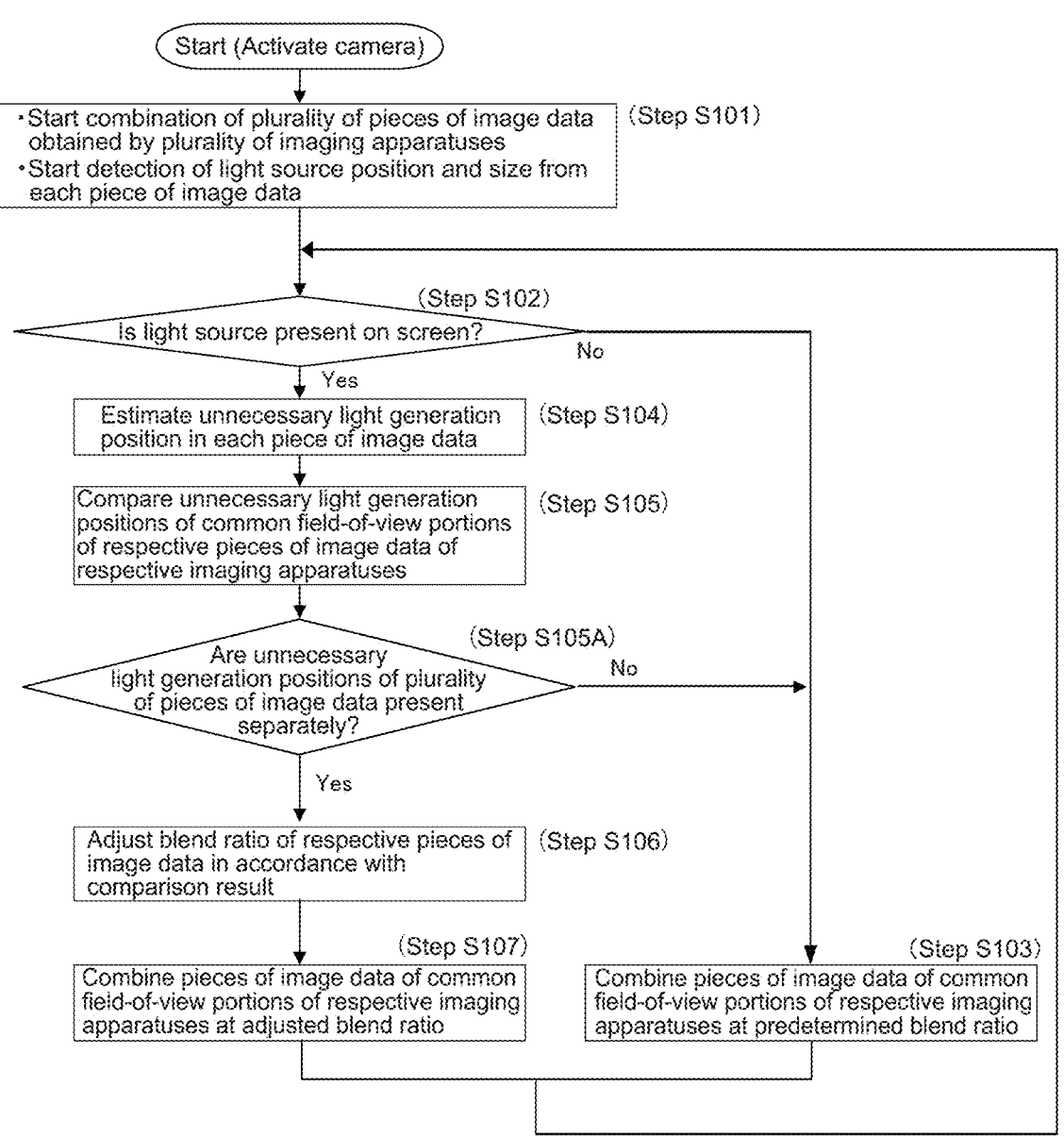
FIG. 14 A flowchart of combination processing in which interpolation does not occur.

FIG. 14 is a flowchart of the combination processing in which such interpolation does not occur.

In this modified example, as shown in Step S105A, it is characterized in that in a case where the unnecessary light generation positions of the plurality of pieces of image data are present separately in the common field-of-view portions combined in the projection images of the plurality of pieces of image data, the image processing unit 6 adjusts the blend ratio with respect to the respective pieces of image data and combines the common field-of-view portions. In a case where the unnecessary light generation positions of the plurality of pieces of image data are not present separately, the combining at the predetermined blend ratio in Step S103 is performed.

Application to Vehicle-Mounted Camera System in
Which Plurality of Imaging Apparatuses Covers
Entire Periphery of Vehicle For the purpose of peripheral monitoring or the like by self-driving or free-viewpoint, a case where the plurality of imaging apparatuses is mounted so that their fields of view cover the entire periphery of the vehicle is assumed. In such a case, the present technology can be applied by providing the respective imaging apparatuses so that the field of view of each imaging apparatus partially overlaps the fields of view of one or more other imaging apparatuses.

Figure 15:
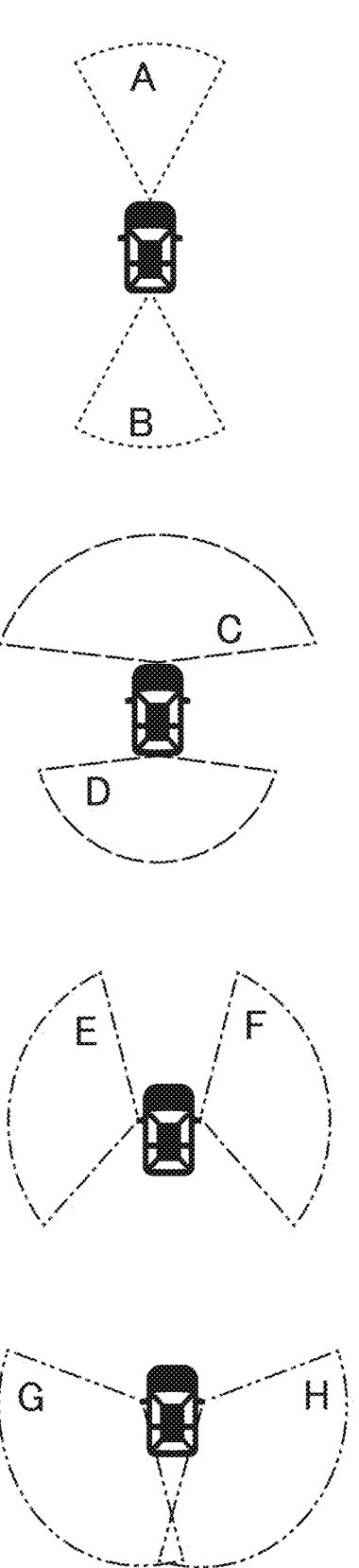
FIG. 15 A diagram showing respective fields of view of eight imaging apparatuses mounted on a vehicle.
Figure 16:
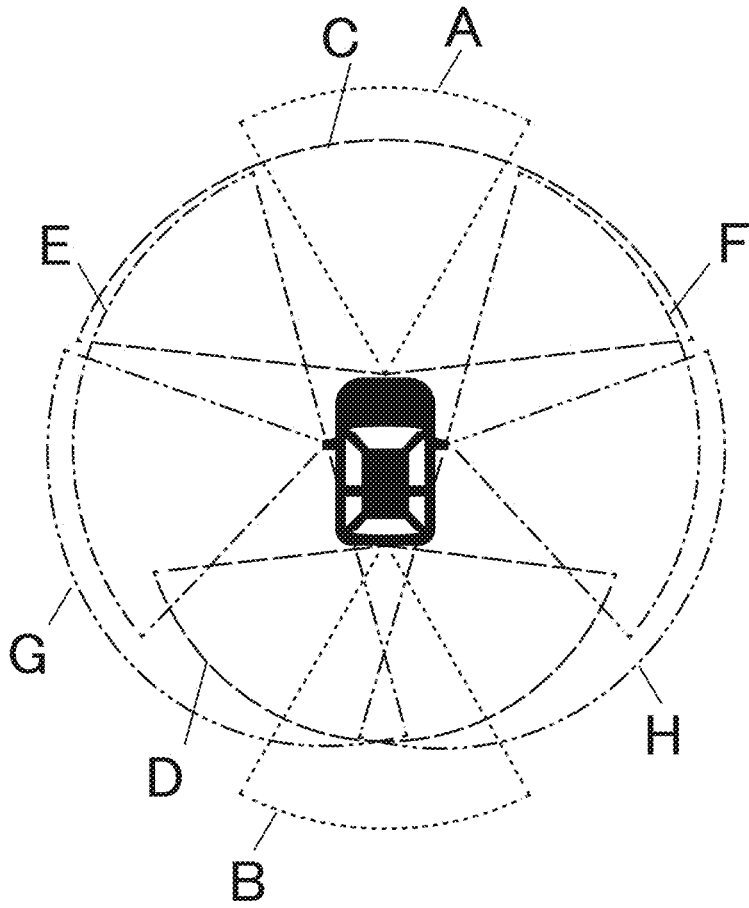
FIG. 16 A diagram showing the fields of view of the respective imaging apparatuses of FIG. 15, overlapping each other on a planar view.

FIG. 15 is a diagram showing the fields of view of eight imaging apparatuses mounted on the vehicle and FIG. 16 is a diagram showing the fields of view of these imaging apparatuses in an overlapping manner in a planar view.

In these figures, A to H denote individual fields of view of the eight imaging apparatuses, respectively. Here, the field of view A and the field of view C partially overlap each other, and the fields of view partially overlap each other in the relationship between the field of view B and the field of view D, between the field of view C and the field of view E, between the field of view C and the field of view F, between the field of view E and the field of view D, between the field of view E and the field of view G, between the field of view F and the field of view D, and between the field of view F and the field of view H. In such a case, by applying the present technology for each combination of the imaging apparatuses having the fields of view partially overlapping each other, a composite image with unnecessary light removed in the entire periphery of the vehicle is obtained and the monitoring accuracy of the periphery of the vehicle can be improved.

Modified Example 2

Application to Calculation of Degree of Reliability
of Target Recognition Result The case of removing unnecessary light such as ghost and flare from the image data obtained by the imaging apparatuses has been described herein. However, in the present technology, the detection result of the unnecessary light generation position can be applied to other processing.

For example, a case of utilizing the present technology for correcting a degree of reliability that is an index value of the probability of a recognition result of a specific target such as a pedestrian recognized from image data obtained by an imaging apparatus will be considered.

Figure 17:
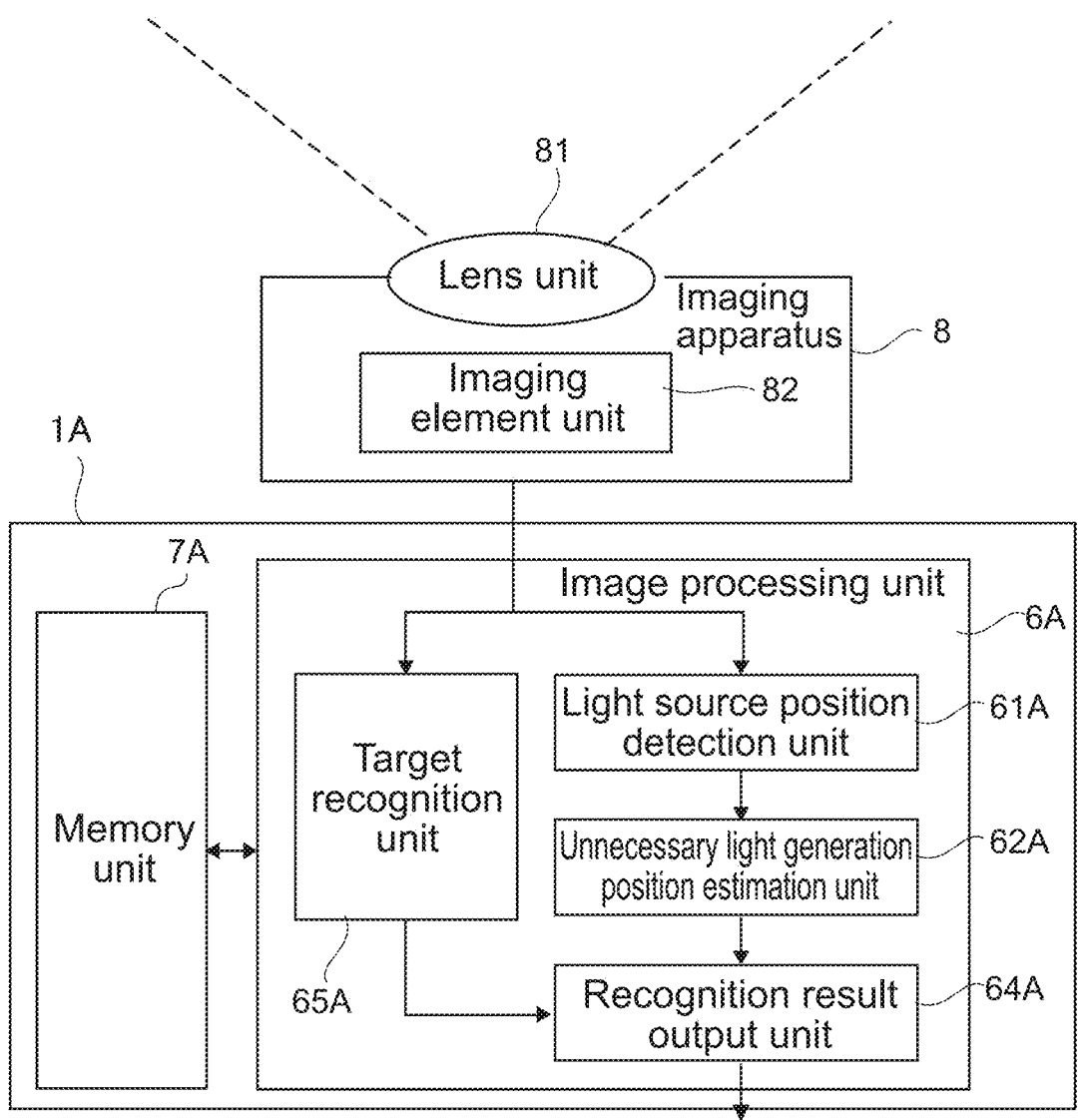
FIG. 17 A block diagram showing a configuration of an image processing unit 6A capable of recognizing a specific target such as a pedestrian from image data obtained by an imaging apparatus 8 and correcting a degree of reliability of a recognition result on the basis of an estimation result of an unnecessary light generation position.

FIG. 17 is a block diagram showing a configuration of an information processing apparatus 1A including an image processing unit 6A capable of recognizing a specific target such as a pedestrian from image data obtained by an imaging apparatus 8 and correcting the degree of reliability of the recognition result.

The image processing unit 6A has a light source position detection unit 61A, an unnecessary light generation position detection unit 62A, a target recognition unit 65A, and a recognition result output unit 64.

The light source position detection unit 61A and the unnecessary light generation position detection unit 62A are the same as those described above in FIG. 1, and a duplex description is thus omitted here.

The target recognition unit 65A performs processing of recognizing a specific target such as a pedestrian from the image data. At the time of this recognition, the target recognition unit 65A generates a matching score as the degree of reliability indicating the probability of the recognition result and outputs this degree of reliability together with the recognition result of the target to the recognition result output unit 64.

On the basis of the estimation result of the unnecessary light generation position by the unnecessary light generation position detection unit 62A, the recognition result output unit 64A updates the degree of reliability of the recognition result input by the target recognition unit 65A and outputs the recognition result including the updated degree of reliability to a higher-order processing unit.

In this modified example, for example, in a case where the unnecessary light generation position is detected, the image processing unit 6A corrects the degree of reliability with respect to the recognition result of the recognition target to be lower. Alternatively, the degree of overlapping between the position of the recognition target and the unnecessary light generation position in the image data may be calculated and the degree of reliability with respect to the recognition result of the recognition target may be corrected to be lower as the degree of overlapping becomes higher.

The higher-order processing unit is configured to assess the recognition result on the basis of the degree of reliability and performs control depending on the recognition result on the basis of this assessment result. For example, in a case where the degree of reliability is smaller than a threshold, the recognition result of the target can be invalidated. Accordingly, the probability of misrecognition of the target due to unnecessary light can be reduced, and the monitoring accuracy can be improved.

Figure 18:
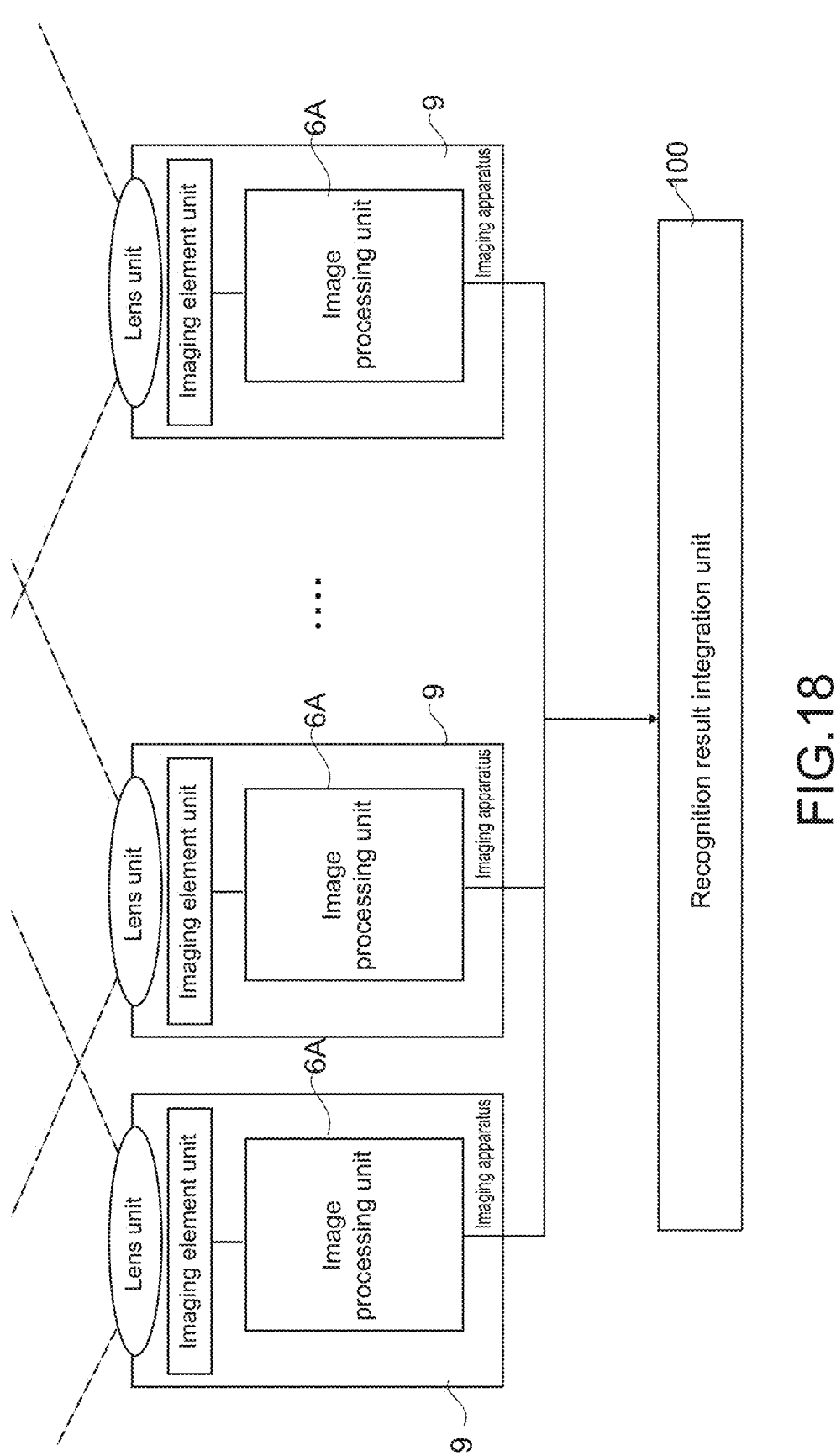
FIG. 18 A block diagram showing a configuration of an imaging system including a plurality of imaging apparatuses installing the image processing unit 6A of FIG. 17.

FIG. 18 is a block diagram showing a configuration of an imaging system that includes image processing units 6A having the configuration of FIG. 17 in a plurality of imaging apparatuses 9, 9, . . . , 9 mounted on a vehicle and having fields of view partially common to each other, respectively, and that outputs target recognition results including the degrees of reliability from the respective imaging apparatuses 9, 9, . . . , 9 to a recognition result integration unit 100 and performs integration processing these target recognition results on the basis of the degree of reliability at the recognition result integration unit 100.

Figure 19:
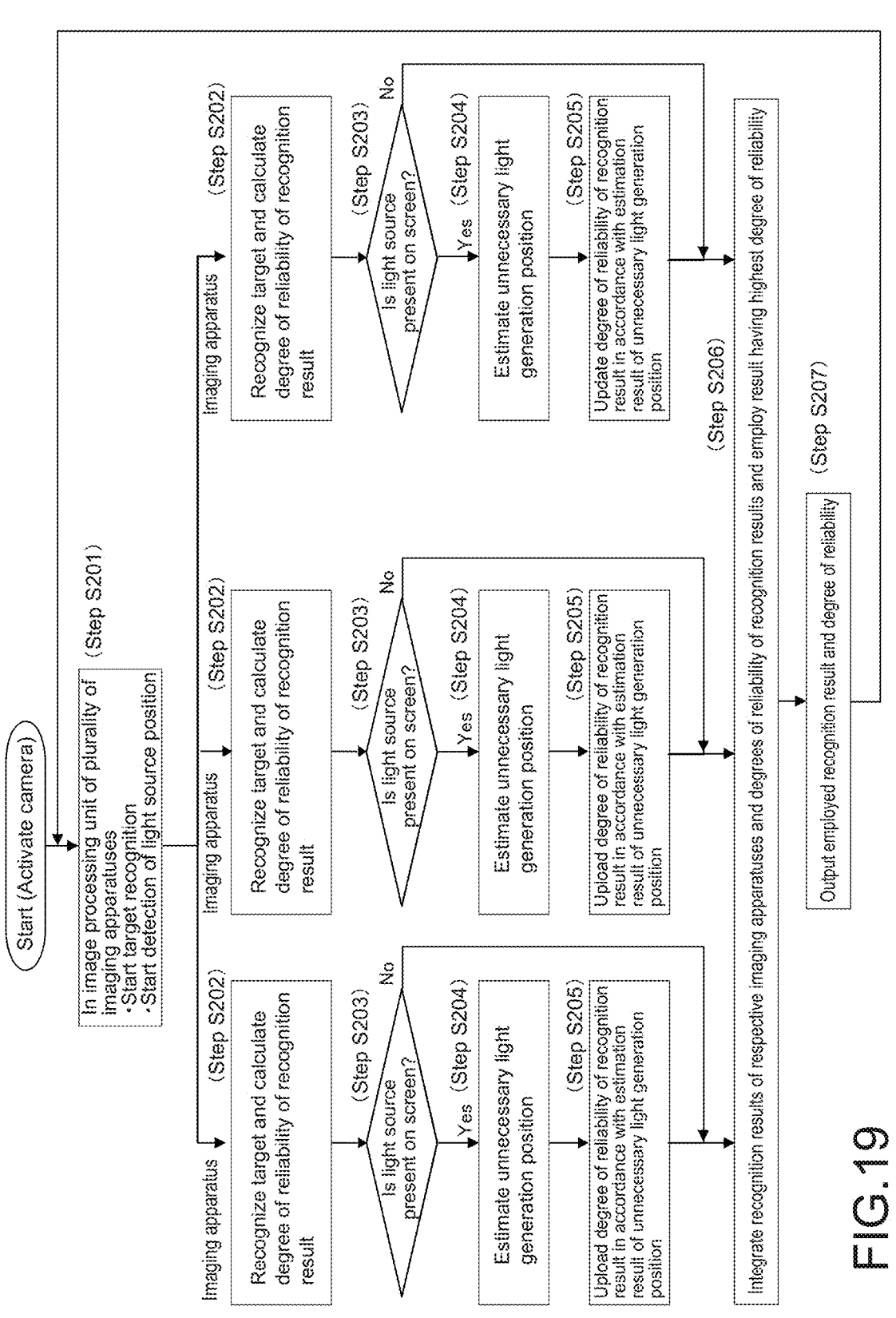
FIG. 19 A flowchart of processing of the imaging system of FIG. 18.

FIG. 19 is a flowchart of processing of this imaging system.

The plurality of imaging apparatuses 9 each including the image processing unit 6A is activated, search of a target such as a pedestrian from image data is started in the image processing unit 6A of each of the plurality of imaging apparatuses 9, and detection of the position of a light source in the image data is started (Step S201).

The plurality of imaging apparatuses 9 each includes the image processing unit 6A. In a case where the light source has been detected (Yes in Step S203), each image processing unit 6A estimates an unnecessary light generation position on the basis of information regarding the position and size of the detected light source stored in the database (Step S204). Next, the image processing unit 6A updates the degree of reliability of the recognition result of the target in accordance with the estimation result of the unnecessary light generation position (Step S205). For example, if it is estimated that the unnecessary light generation position is present, the image processing unit 6A updates the degree of reliability to be lower.

Next, the respective image processing units 6A of the plurality of imaging apparatuses 9 output the target recognition results including the degrees of reliability to the recognition result integration unit 100. The recognition result integration unit 100 performs integration processing of the plurality of input target search results and the degrees of reliability, employs the target recognition result having the highest degree of reliability, for example, as the integration result (Step S206), and outputs this target recognition result to a higher-order apparatus (Step S207).

Figure 20:
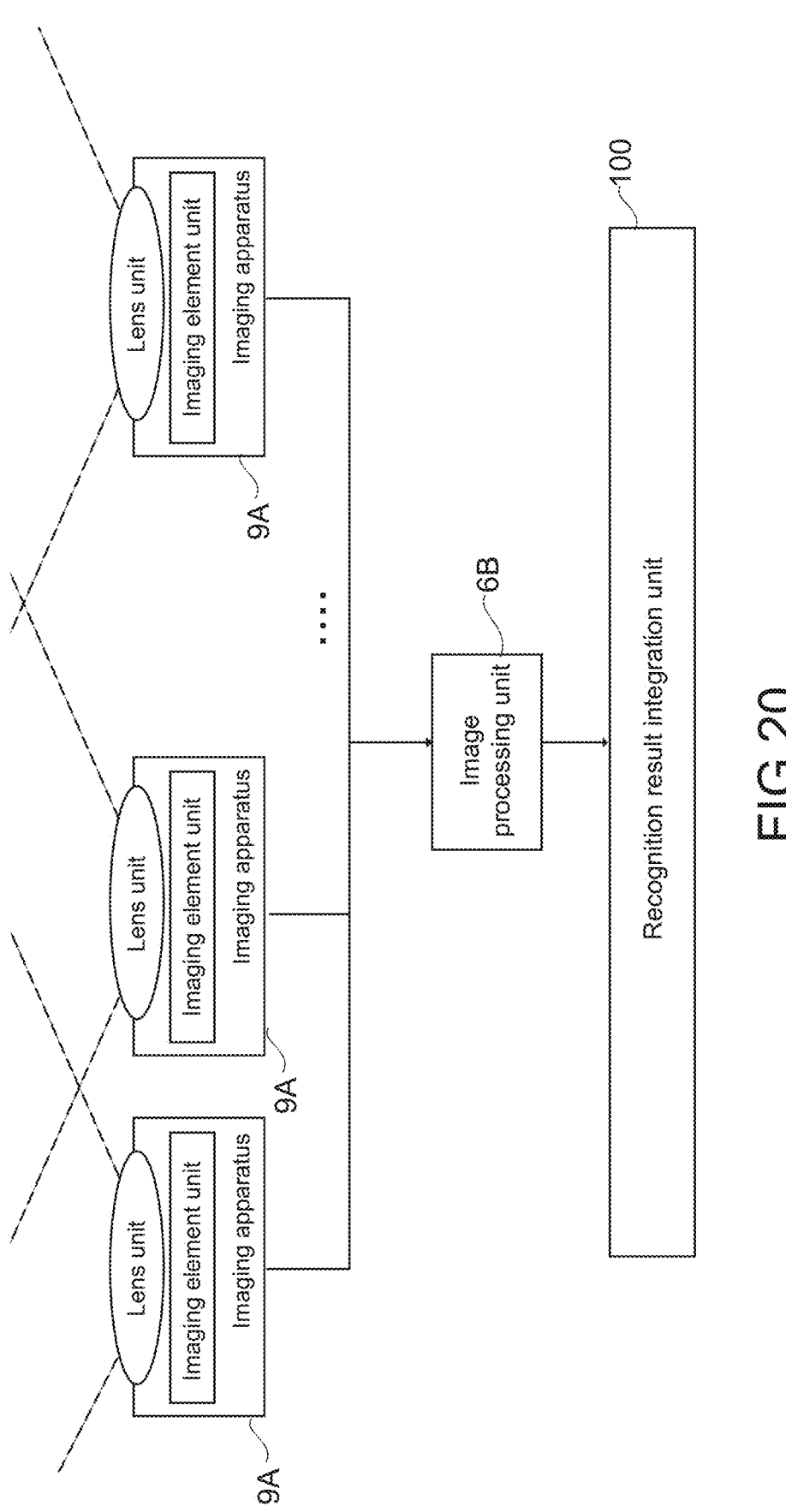
FIG. 20 A diagram showing a modified example of the imaging system of FIG. 18.

It should be noted that although the image processing is performed in the image processing units 6A included in the respective imaging apparatuses 9, 9, . . . , 9 in the modified example 2, the pieces of image data of the plurality of imaging apparatuses 9, 9, . . . , 9 may be processed together in a single image processing unit 6B as shown in FIG. 20.

Application Example

The technology according to the present disclosure can be applied to various products. For example, the technology according to the present disclosure may be realized as a device mounted on any kind of movable objects such as a car, an electric car, a hybrid electric car, a motorcycle, a bicycle, a personal mobility, an airplane, a drone, a ship, a robot, a construction machine, and an agricultural machine (tractor).

Figure 21:
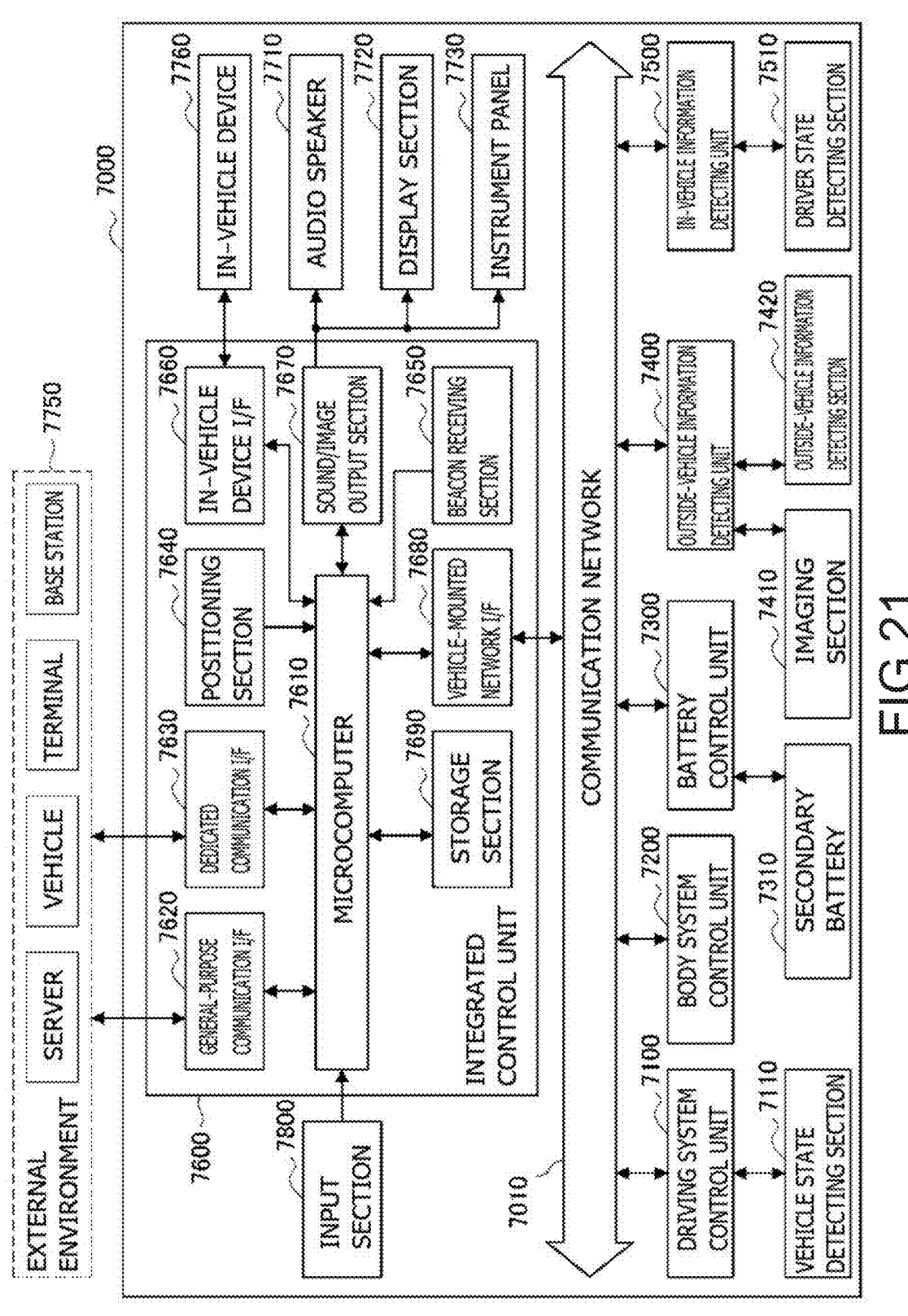
FIG. 21 A block diagram depicting an example of schematic configuration of a vehicle control system 7000 that is an example of a mobile body control system to which a technology according to the present disclosure can be applied.

FIG. 21 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 21, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 21 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 22:
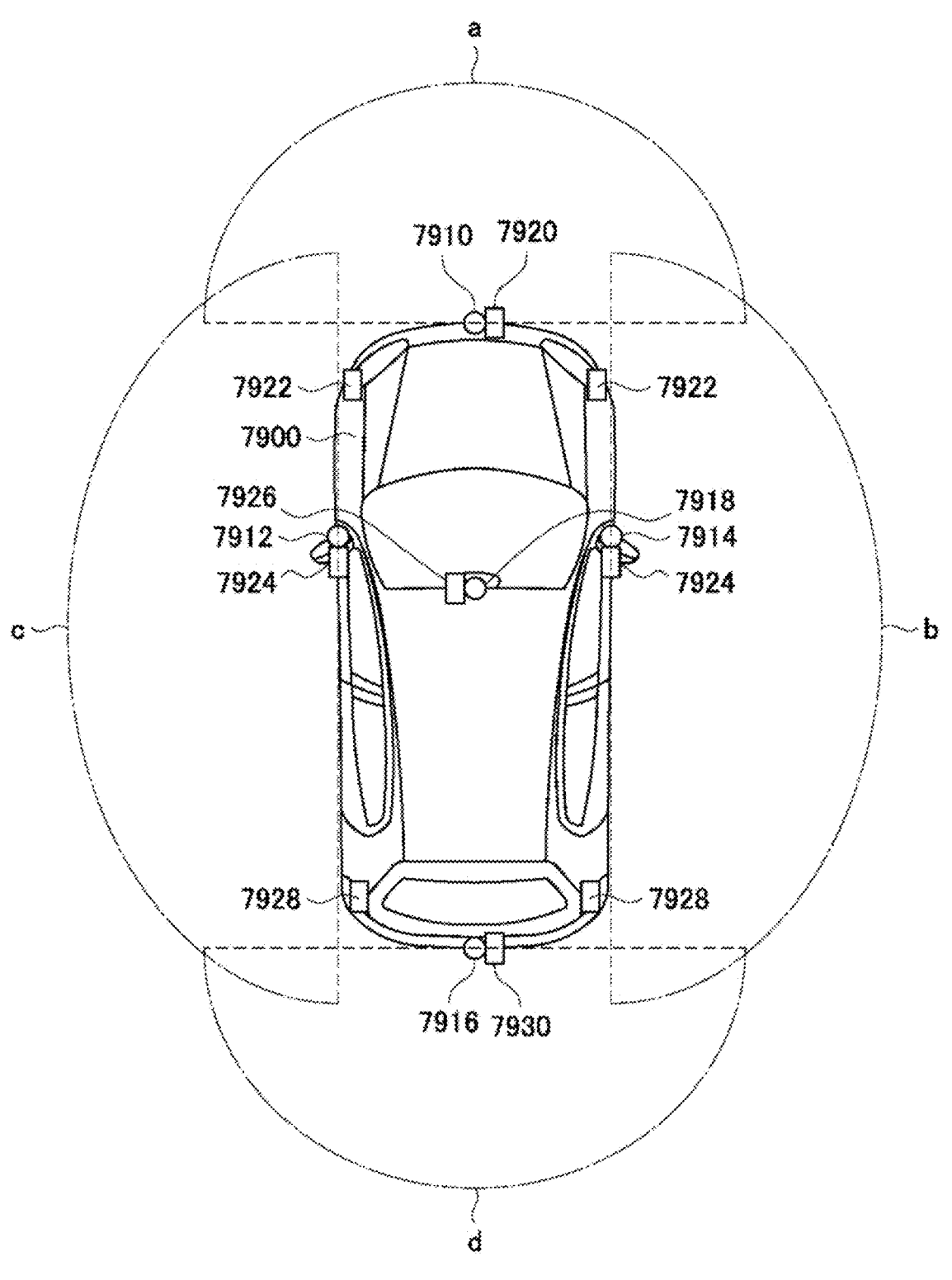
FIG. 22 A diagram showing an example of installation positions of an imaging section 7410 and an outside-vehicle information detecting section 7420.

FIG. 22 is a diagram depicting an example of installation positions of the imaging section 7410 and the outside-vehicle information detecting section 7420. Imaging sections 7910, 7912, 7914, 7916, and 7918 are, for example, disposed at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 22 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 21, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like.

The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 21, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 21 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It should be noted that a computer program for realizing the respective functions of the information processing apparatus 1 according to this embodiment has been described above using FIG. 1 can be implemented on any control unit or the like. Moreover, a recording medium readable by a computer, in which such a computer program has been stored, can also be provided. The recording medium is, for example, a magnetic disk, an optical disc, a magneto-optical disk, a flash memory, or the like. Moreover, the above-mentioned computer program may be delivered via, for example, a network without using the recording medium.

In the vehicle control system 7000 described above, the information processing apparatus 100 according to this embodiment described using FIG. 1 can be applied to the integrated control unit 7600 according to the application example shown in FIG. 21. For example, the image processing unit 6 of the information processing apparatus 100 corresponds to the microcomputer 7610, the storage section 7690, and the vehicle-mounted network I/F 7680 of the integrated control unit 7600. For example, the integrated control unit 7600 may be configured to detect positions of light sources in pieces of image data captured by the imaging sections 7910, 7912, 7914, 7916, and 7918 mounted on the vehicle 7900 as shown in FIG. 22 and estimate unnecessary light generation positions on the basis of the detected positions of the light sources. Accordingly, it is possible to generate a composite image with unnecessary light removed or reduced from a plurality of pieces of image data having partially common fields of view, out of pieces of image data obtained by the plurality of imaging sections 7910, 7912, 7914, 7916, and 7918. Moreover, the microcomputer 7610 of the integrated control unit 7600 is capable of updating the degree of reliability of the recognition result of the target on the basis of the estimation result of the unnecessary light generation position and obtaining the degree of reliability with a higher accuracy. It can lower the probability of misrecognition of the target due to the unnecessary light, and the monitoring accuracy can be improved.

Moreover, at least some components of the information processing apparatus 100 described above using FIG. 1 may be realized in a module for the integrated control unit 7600 shown in FIG. 21 (e.g., an integrated circuit module constituted by a single die). Alternatively, the information processing apparatus 100 described above using FIG. 1 may be realized by a plurality of control units of the vehicle control system 7000 shown in FIG. 21.

In addition, the present technology is not limited only to the above-mentioned embodiment and various modifications can be made without departing from the gist of the present invention as a matter of course.

The present technology can also take the following configurations.

(1) An information processing apparatus, including
   an image processing unit that
      detects a position of a light source in image data captured by an imaging apparatus and
      estimates an unnecessary light generation position in the image data on the basis of the detected position of the light source.

(2) The information processing apparatus according to (1), in which
   the image processing unit
      detects, with respect to a plurality of pieces of image data respectively captured by a plurality of imaging apparatuses having partially common fields of view, positions of light sources and estimates unnecessary light generation positions on the basis of the detected positions of the light sources and
      combines pieces of image data of common field-of-view portions respectively captured by the plurality of imaging apparatuses and generates image data of the unnecessary light generation position with unnecessary light removed or reduced.

(3) The information processing apparatus according to (1) or (2), in which
   the image processing unit compares unnecessary light generation positions respectively estimated with respect to common field-of-view portions of the plurality of pieces of image data and adjusts a blend ratio for the combination on the basis of a result of the comparison.

(4) The information processing apparatus according to any one of (1) to (3), further including
   a memory unit that stores, in advance, information regarding the unnecessary light generation position with respect to the position of the light source in the image data, in which
   the image processing unit estimates the unnecessary light generation position on the basis of the detected position of the light source and the information stored by the memory unit.

(5) The information processing apparatus according to any one of (1) to (4), in which
   the image processing unit determines, on the basis of a distance between the detected position of the light source and an unnecessary light generation prediction position that is fixedly predetermined, whether the estimated unnecessary light generation position is a significant unnecessary light generation position.

(6) The information processing apparatus according to (1), in which
   the image processing unit
      recognizes a specific target from the image data captured by the imaging apparatus and generates a recognition result together with a degree of reliability of the recognition result and
      updates the degree of reliability in accordance with presence/absence of the estimated unnecessary light generation position or a degree of overlapping between a position of the recognized target and the unnecessary light generation position.

(7) An information processing method, including:
   detecting a position of a light source in image data captured by an imaging apparatus; and
   estimating unnecessary light generation position in the image data on the basis of the detected position of the light source.

(8) The information processing method according to (7), further including:
   detecting, with respect to a plurality of pieces of image data respectively captured by a plurality of imaging apparatuses having partially common fields of view, positions of light sources and estimating unnecessary light generation positions on the basis of the detected positions of the light sources; and
   combining pieces of image data of common field-of-view portions respectively captured by the plurality of imaging apparatuses and generating image data of the unnecessary light generation position with unnecessary light removed or reduced.

(9) The information processing method according to (7) or (8), further including
   comparing unnecessary light generation positions respectively estimated with respect to common field-of-view portions of the plurality of pieces of image data and adjusting a blend ratio for the combination on the basis of a result of the comparison.

(10) The information processing method according to any one of (7) to (9), further including estimating the unnecessary light generation position on the basis of the detected position of the light source and information stored in a memory unit that stores, in advance, information regarding the unnecessary light generation position with respect to the position of the light source in the image data.

(11) The information processing method according to any one of (7) to (10), in which determining, on the basis of a distance between the detected position of the light source and an unnecessary light generation prediction position that is fixedly predetermined, whether the estimated unnecessary light generation position is a significant unnecessary light generation position.

(12) The information processing method according to (7), further including:

recognizing the specific target from the image data captured by the imaging apparatus and generating a recognition result together with a degree of reliability of the recognition result; and updating the degree of reliability in accordance with presence/absence of the estimated unnecessary light generation position or a degree of overlapping between a position of the recognized target and the unnecessary light generation position.

(13) A program that causes a computer to execute:

detecting a position of a light source in image data captured by an imaging apparatus; and estimating unnecessary light generation position in the image data on the basis of the detected position of the light source.

(14) The program according to (13) that causes the computer to execute:

detecting, with respect to a plurality of pieces of image data respectively captured by a plurality of imaging apparatuses having partially common fields of view, positions of light sources and estimating unnecessary light generation positions on the basis of the detected positions of the light sources; and combining pieces of image data of common field-of-view portions respectively captured by the plurality of imaging apparatuses and generating image data of the unnecessary light generation position with unnecessary light removed or reduced.

(15) The program according to (13) or (14) that causes the computer to execute comparing unnecessary light generation positions respectively estimated with respect to common field-of-view portions of the plurality of pieces of image data and adjusting a blend ratio for the combination on the basis of a result of the comparison.

(16) The program according to any one of (13) to (15) that causes the computer to execute estimating the unnecessary light generation position on the basis of the detected position of the light source and information stored in a memory unit that stores, in advance, information regarding the unnecessary light generation position with respect to the position of the light source in the image data.

(17) The program according to any one of (13) to (16) that causes the computer to execute determining, on the basis of a distance between the detected position of the light source and an unnecessary light generation prediction position that is fixedly predetermined, whether the estimated unnecessary light generation position is a significant unnecessary light generation position.

(18) The program according to (13) that causes the computer to execute:

recognizing the specific target from the image data captured by the imaging apparatus and generating a recognition result together with a degree of reliability of the recognition result; and updating the degree of reliability in accordance with presence/absence of the estimated unnecessary light generation position or a degree of overlapping between a position of the recognized target and the unnecessary light generation position.

(19) An imaging apparatus, including:

an imaging element unit that captures image data; and an image processing unit that detects a position of a light source in the image data captured by the imaging element unit and estimates an unnecessary light generation position in the image data on the basis of the detected position of the light source.

(20) The imaging apparatus according to (19), in which the image processing unit detects, with respect to a plurality of pieces of image data respectively captured by a plurality of imaging apparatuses having partially common fields of view, positions of the light sources and estimates unnecessary light generation positions on the basis of the detected positions of the light sources and combines pieces of image data of common field-of-view portions respectively captured by the plurality of imaging apparatuses and generates image data of the unnecessary light generation position with unnecessary light removed or reduced.

(21) The imaging apparatus according to (19) or (20), in which the image processing unit compares the unnecessary light generation positions respectively estimated with respect to the common field-of-view portions of the plurality of pieces of image data and adjusts a blend ratio for the combination on the basis of a result of the comparison.

(22) The imaging apparatus according to any one of (19) to (21), further including a memory unit that stores, in advance, information regarding the unnecessary light generation position with respect to the position of the light source in the image data, in which the image processing unit estimates the unnecessary light generation position on the basis of the detected position of the light source and the information stored by the memory unit.

(23) The imaging apparatus according to any one of (19) to (22), in which the image processing unit determines, on the basis of a distance between the detected position of the light source and an unnecessary light generation prediction position that is fixedly predetermined, whether the estimated unnecessary light generation position is a significant unnecessary light generation position.

(24) The imaging apparatus according to (19), in which the image processing unit recognizes a specific target from the image data captured by the imaging apparatus and generates a recognition result together with a degree of reliability of the recognition result and

US 12,573,173 B2

23 updates the degree of reliability in accordance with presence/absence of the estimated unnecessary light generation position or a degree of overlapping between a position of the recognized target and the unnecessary light generation position.

(25) An imaging system, including:

an imaging apparatus that captures image data; and an image processing unit that detects a position of a light source in the image data captured by the imaging element unit and estimates an unnecessary light generation position in the image data on the basis of the detected position of the light source.

(26) The imaging system according to (25), in which the image processing unit detects, with respect to a plurality of pieces of image data respectively captured by a plurality of imaging apparatuses having partially common fields of view, positions of the light sources and estimates unnecessary light generation positions on the basis of the detected positions of the light sources and combines pieces of image data of common field-of-view portions respectively captured by the plurality of imaging apparatuses and generates image data of the unnecessary light generation position with unnecessary light removed or reduced.

(27) The imaging system according to (25) or (26), in which the image processing unit compares the unnecessary light generation positions respectively estimated with respect to the common field-of-view portions of the plurality of pieces of image data and adjusts a blend ratio for the combination on the basis of a result of the comparison.

(28) The imaging system according to any one of (25) to (27), further including a memory unit that stores, in advance, information regarding the unnecessary light generation position with respect to the position of the light source in the image data, in which the image processing unit estimates the unnecessary light generation position on the basis of the detected position of the light source and the information stored by the memory unit.

(29) The imaging system according to any one of (25) to (28), in which the image processing unit determines, on the basis of a distance between the detected position of the light source and an unnecessary light generation prediction position that is fixedly predetermined, whether the estimated unnecessary light generation position is a significant unnecessary light generation position.

(30) The imaging system according to (25), in which the image processing unit recognizes a specific target from the image data captured by the imaging apparatus and generates a recognition result together with a degree of reliability of the recognition result and updates the degree of reliability in accordance with presence/absence of the estimated unnecessary light generation position or a degree of overlapping between a position of the recognized target and the unnecessary light generation position.

24

(31) An imaging system, including:

a plurality of imaging apparatuses having partially common fields of view; and an image processing unit that detects, with respect to a plurality of pieces of image data respectively captured by the plurality of imaging apparatuses, positions of light sources and estimates unnecessary light generation positions on the basis of the detected positions of the light sources and combines pieces of image data of common field-of-view portions respectively captured by the plurality of imaging apparatuses and generates image data of the unnecessary light generation position with unnecessary light removed or reduced.

(32) The imaging system according to (31), in which the image processing unit detects, with respect to a plurality of pieces of image data respectively captured by a plurality of imaging apparatuses having partially common fields of view, positions of the light sources and estimates unnecessary light generation positions on the basis of the detected positions of the light sources and combines pieces of image data of common field-of-view portions respectively captured by the plurality of imaging apparatuses and generates image data of the unnecessary light generation position with unnecessary light removed or reduced.

(33) The imaging system according to (31) or (32), in which the image processing unit compares the unnecessary light generation positions respectively estimated with respect to the common field-of-view portions of the plurality of pieces of image data and adjusts a blend ratio for the combination on the basis of a result of the comparison.

(34) The imaging system according to any one of (31) to (33), further including a memory unit that stores, in advance, information regarding the unnecessary light generation position with respect to the position of the light source in the image data, in which the image processing unit estimates the unnecessary light generation position on the basis of the detected position of the light source and the information stored by the memory unit.

(35) The imaging system according to any one of (31) to (34), in which the image processing unit determines, on the basis of a distance between the detected position of the light source and an unnecessary light generation prediction position that is fixedly predetermined, whether the estimated unnecessary light generation position is a significant unnecessary light generation position.

(36) The imaging system according to (31), in which the image processing unit recognizes a specific target from the image data captured by the imaging apparatus and generates a recognition result together with a degree of reliability of the recognition result and updates the degree of reliability in accordance with presence/absence of the estimated unnecessary light generation position or a degree of overlapping between a position of the recognized target and the unnecessary light generation position.

(37) An imaging system, including:
a plurality of imaging apparatuses each including
an imaging element unit that captures image data, and
an image processing unit that
recognizes a specific target from the image data captured by the imaging element and calculates a degree of reliability of the recognition result,
detects a position of a light source from the image data captured by the imaging element and estimates an unnecessary light generation position in the image data on the basis of the detected position of the light source, and
updates the degree of reliability in accordance with presence/absence of the estimated unnecessary light generation position or a degree of overlapping between a position of the recognized target and the unnecessary light generation position; and
an integration processing unit that integrates, on the basis of the degree of reliability, recognition results of the plurality of targets respectively generated by the image processing units of the plurality of imaging apparatuses, in which
the respective imaging element units of the plurality of imaging apparatuses have fields of view partially common to each other.

(38) The imaging system according to (37), in which
the image processing unit
detects, with respect to a plurality of pieces of image data respectively captured by a plurality of imaging apparatuses having partially common fields of view, positions of the light sources and estimates unnecessary light generation positions on the basis of the detected positions of the light sources and
combines pieces of image data of common field-of-view portions respectively captured by the plurality of imaging apparatuses and generates image data of the unnecessary light generation position with unnecessary light removed or reduced.

(39) The imaging system according to (37) or (38), in which
the image processing unit compares the unnecessary light generation positions respectively estimated with respect to the common field-of-view portions of the plurality of pieces of image data and adjusts a blend ratio for the combination on the basis of a result of the comparison.

(40) The imaging system according to any one of (37) to (39), further including
a memory unit that stores, in advance, information regarding the unnecessary light generation position with respect to the position of the light source in the image data, in which
the image processing unit estimates the unnecessary light generation position on the basis of the detected position of the light source and the information stored by the memory unit.

(41) The imaging system according to any one of (37) to (40), in which
the image processing unit determines, on the basis of a distance between the detected position of the light source and an unnecessary light generation prediction position that is fixedly predetermined, whether the estimated unnecessary light generation position is a significant unnecessary light generation position.

(42) The imaging system according to (37), in which
the image processing unit
recognizes a specific target from the image data captured by the imaging apparatus and generates a recognition result together with a degree of reliability of the recognition result and
updates the degree of reliability in accordance with presence/absence of the estimated unnecessary light generation position or a degree of overlapping between a position of the recognized target and the unnecessary light generation position.

REFERENCE SIGNS LIST 1 information processing apparatus
2, 3 imaging field of view
4, 5 imaging apparatus
6 image processing unit
7 memory unit
8, 9 imaging apparatus
31, 32 unnecessary light generation position
35, 36 ghost
61 light source position detection unit
62 unnecessary light generation position detection unit
63 image combining unit
64 recognition result output unit
100 recognition result integration unit

The invention claimed is:

1. An information processing apparatus, comprising:
an image processor configured to:
obtain a first piece of image data captured by a first imaging apparatus and a second piece of image data captured by a second imaging apparatus, wherein the first piece of image data and the second piece of image data have a common field-of-view portion;
detect, within each of the first piece of image data and the second piece of image data, a position of a light source;
estimate, in the common field-of-view portion of each of the first piece of image data and the second piece of image data, a position of unnecessary light on a basis of the detected position of the light source in each of the first piece of image data and the second piece of image data; and
generate a virtual single-viewpoint image by combining the first piece of image data and the second piece of image data with an unnecessary light in the common field of view portion reduced or eliminated
wherein the unnecessary light is detected in the first piece of image data based on a first distance in the first piece of image data between a first center position of a flare and a first position of a detected light source, and
wherein the unnecessary light is detected in the second piece of image data based on a second distance in the second piece of image data between a second center position of a flare and a second position of a detected light source.

2. The information processing apparatus according to claim 1, wherein
The image processor compares the position of unnecessary light estimated with respect to the common field-of-view portion of the first piece of image data and the second piece of image data and adjusts a blend ratio for the virtual single-viewpoint image on a basis of a result of the comparison.

3. The information processing apparatus according to claim 2, further comprising
a memory that stores, in advance, information regarding the position of unnecessary light with respect to the position of the light source in the image data, wherein the image processor estimates the position of the unnecessary light on a basis of the detected position of the light source and the information stored by the memory.

4. The information processing apparatus according to claim 3, wherein the image processor determines, on a basis of a distance between the detected position of the light source and an unnecessary light generation prediction position that is fixedly predetermined, whether the estimated position of the unnecessary light is a significant unnecessary light generation position.

5. The information processing apparatus according to claim 1, wherein the image processor is configured to:

recognize a specific target from the image data captured by the first imaging apparatus or the second imaging apparatus and generate a recognition result together with a degree of reliability of the recognition result; and update the degree of reliability in accordance with presence/absence of the estimated position of the unnecessary light or a degree of overlapping between a position of the recognized target and the unnecessary light.

6. An information processing method, comprising:

obtaining a first piece of image data captured by a first imaging apparatus and a second piece of image data captured by a second imaging apparatus, wherein the first piece of image data and the second piece of image data have a common field-of-view portion;

detecting, within each of the first piece of image data and the second piece of image data, a position of a light source;

estimating, in the common field-of-view portion of each of the first piece of image data and the second piece of image data, a position of unnecessary light on a basis of the detected position of the light source in each of the first piece of image data and the second piece of image data; and generating a virtual single-viewpoint image by combining the first piece of image data and the second piece of image data with an unnecessary light in the common field of view portion reduced or eliminated wherein the unnecessary light is detected in the first piece of image data based on a first distance in the first piece of image data between a first center position of a flare and a first position of a detected light source, and wherein the unnecessary light is detected in the second piece of image data based on a second distance in the second piece of image data between a second center position of a flare and a second position of a detected light source.

7. A non-transitory computer-readable medium storing a program that, when processed by a processor, causes the processor to implement the following method:

obtaining a first piece of image data captured by a first imaging apparatus and a second piece of image data captured by a second imaging apparatus, wherein the first piece of image data and the second piece of image data have a common field-of-view portion;

detecting, within each of the first piece of image data and the second piece of image data, a position of a light source;

estimating, in the common field-of-view portion of each of the first piece of image data and the second piece of image data, a position of unnecessary light on a basis of the detected position of the light source in each of the first piece of image data and the second piece of image data; and generating a virtual single-viewpoint image by combining the first piece of image data and the second piece of image data with an unnecessary light in the common field of view portion reduced or eliminated wherein the unnecessary light is detected in the first piece of image data based on a first distance in the first piece of image data between a first center position of a flare and a first position of a detected light source, and wherein the unnecessary light is detected in the second piece of image data based on a second distance in the second piece of image data between a second center position of a flare and a second position of a detected light source.

\* \* \* \* \*